(12) United States Patent
Takeuchi

(10) Patent No.: US 7,884,517 B2
(45) Date of Patent: Feb. 8, 2011

(54) ELECTRIC MACHINE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 59 days.

(21) Appl. No.: 12/359,672

(22) Filed: Jan. 26, 2009

(65) Prior Publication Data

US 2009/0160383 A1 Jun. 25, 2009

Related U.S. Application Data

(63) Continuation of application No. 10/556,367, filed as application No. PCT/JP2004/007072 on May 18, 2004, now Pat. No. 7,501,733.

(51) Int. Cl.
*H02K 21/12* (2006.01)

(52) U.S. Cl. .................. 310/112; 310/156.32

(58) Field of Classification Search ............... 310/112, 310/266, 268, 156.32, 156.35; 318/400.34, 318/376
See application file for complete search history.

(56) References Cited

U.S. PATENT DOCUMENTS

| | | | |
|---|---|---|---|
| 4,633,149 A | 12/1986 | Welterlin | |
| 5,034,669 A * | 7/1991 | Sako et al. .................. | 318/376 |
| 5,079,461 A * | 1/1992 | Schluter et al. ........... | 310/67 A |
| 5,202,613 A | 4/1993 | Kruse | |
| 5,841,261 A | 11/1998 | Nojima et al. | |
| 5,869,944 A * | 2/1999 | Tanina ........................ | 318/599 |
| 5,917,248 A * | 6/1999 | Seguchi et al. ................. | 290/31 |
| 5,929,541 A * | 7/1999 | Naito et al. ............... | 310/12.18 |
| 5,945,766 A | 8/1999 | Kim et al. | |
| 5,990,651 A | 11/1999 | Iwazawa et al. | |
| 6,297,575 B1 | 10/2001 | Yang | |
| 6,351,091 B1 | 2/2002 | Heinkel et al. | |
| 6,515,390 B1 | 2/2003 | Lopatinsky et al. | |
| 6,534,948 B2 | 3/2003 | Ohura et al. | |
| 6,570,273 B2 * | 5/2003 | Hazelton ................. | 310/12.25 |
| 6,661,128 B2 | 12/2003 | Mori et al. | |
| 6,940,200 B2 | 9/2005 | Lopatinsky et al. | |

FOREIGN PATENT DOCUMENTS

| | | |
|---|---|---|
| DE | 296 23 570 | 1/1999 |
| DE | 692 27 728 | 7/1999 |

(Continued)

OTHER PUBLICATIONS

International Search Report for PCT/JP2004/007072, dated Aug. 18, 2004 (ISA/JP).

(Continued)

*Primary Examiner*—Dang D Le
(74) *Attorney, Agent, or Firm*—Harness, Dickey & Pierce, P.L.C.

(57) ABSTRACT

A two-phase electric motor includes first and second coil groups and a magnet group. In the magnet group, N poles and S poles are disposed alternatively opposite the first and second coil groups. The first and second coil groups are disposed at positions that are out of phase with each other by an odd multiple of $\pi/2$ in electrical angles. The coils of the first and second coil groups have substantially no magnetic material cores, and the electric motor has substantially no magnetic material yoke for forming a magnetic circuit.

8 Claims, 26 Drawing Sheets

FOREIGN PATENT DOCUMENTS

| | | |
|---|---|---|
| DE | 199 45 761 | 3/2001 |
| EP | 0 548 362 | 6/1993 |
| EP | 0 748 038 | 12/1996 |
| EP | 0 833 439 A1 | 4/1998 |
| EP | 1 071 200 | 7/2000 |
| GB | 2 349 748 | 11/2000 |
| JP | 50-136608 | 10/1975 |
| JP | 51-7414 | 1/1976 |
| JP | 54-40723 | 12/1979 |
| JP | 55-32623 | 3/1980 |
| JP | 55-117184 | 8/1980 |
| JP | 55-141274 | 10/1980 |
| JP | 56-120785 | 9/1981 |
| JP | 56-52777 | 12/1981 |
| JP | 57-47886 | 3/1982 |
| JP | 60-091851 | 5/1985 |
| JP | 60-204248 | 10/1985 |
| JP | 60-219945 | 11/1985 |
| JP | 62-19057 | 2/1987 |
| JP | 62-092790 | 4/1987 |
| JP | 1-101169 | 7/1989 |
| JP | 01-264553 | 10/1989 |
| JP | 02-188184 | 7/1990 |
| JP | 03-139156 | 6/1991 |
| JP | 04-101602 | 4/1992 |
| JP | 04-304189 | 10/1992 |
| JP | 05-252789 | 9/1993 |
| JP | 05-328786 | 12/1993 |
| JP | 05-344698 | 12/1993 |
| JP | 06-038580 | 2/1994 |
| JP | 06-245458 | 9/1994 |
| JP | 6-81480 | 10/1994 |
| JP | 06-303732 | 10/1994 |
| JP | 07-194082 | 7/1995 |
| JP | 07-213044 | 8/1995 |
| JP | 07-336967 | 12/1995 |
| JP | 08-331822 | 12/1996 |
| JP | 09-191621 | 7/1997 |
| JP | 09-238479 | 9/1997 |
| JP | 9-275673 | 10/1997 |
| JP | 10-094232 | 4/1998 |
| JP | 10-146090 | 5/1998 |
| JP | 10-243617 | 9/1998 |
| JP | 10-271784 | 10/1998 |
| JP | 11-089199 | 3/1999 |
| JP | 3057913 | 3/1999 |
| JP | 11-098811 | 4/1999 |
| JP | 3062085 | 6/1999 |
| JP | 11-341854 | 12/1999 |
| JP | 2000-092759 | 3/2000 |
| JP | 2000-095176 | 4/2000 |
| JP | 2000-262026 | 9/2000 |
| JP | 2000-350488 | 12/2000 |
| JP | 2001-136721 | 5/2001 |
| JP | 2001-190083 | 7/2001 |
| JP | 2001-251886 | 9/2001 |
| JP | 2002-335658 | 11/2002 |
| JP | 2003-009486 | 1/2003 |
| JP | 2003-506005 | 2/2003 |
| JP | 2003-510993 | 3/2003 |
| JP | 3094484 U | 3/2003 |
| JP | 2003-153516 | 5/2003 |
| JP | 2003-169430 | 6/2003 |
| JP | 2003-309957 | 10/2003 |
| JP | 2004-104954 | 4/2004 |
| WO | WO 97/08805 | 3/1997 |
| WO | 2004/047258 A2 | 6/2004 |

OTHER PUBLICATIONS

Communication from Japanese Patent Office regarding related application, Jan. 2004.

English translation of Written Opinion of ISA of PCT/JP2004/007072, ISA/IP dated Nov. 21, 2006.

* cited by examiner

STRUCTURE

AC DRIVE SIGNALS

IMMEDIATELY BEFORE PHASE = $2\pi$ (Polarity of A phase is inverted at $2\pi$.)

PHASE = $\pi/4$

IMMEDIATELY BEFORE PHASE = $\pi/2$ (Polarity of B phase is inverted at $\pi/2$.)

PHASE = $3\pi/4$

Fig.5

| PREFERRED APPLICATION | PERMANENT MAGNET | ROTOR MATERIAL | BOBBIN MATERIAL | CASE MATERIAL |
|---|---|---|---|---|
| COST | FERRITE | TYPICAL RESIN | TYPICAL RESIN | TYPICAL RESIN |
| SIZE | HIGH-COST MAGNET | TYPICAL RESIN | TYPICAL RESIN | TYPICAL RESIN |
| POWER CONSUMPTION | HIGH-COST MAGNET | TYPICAL RESIN | TYPICAL RESIN | TYPICAL RESIN |
| VIBRATIONS AND SHOCKS | HIGH-COST MAGNET | CARBON-TYPE RESIN, CERAMICS | CARBON-TYPE RESIN, CERAMICS | CARBON-TYPE RESIN, CERAMICS |
| TEMPERATURE | FERRITE | CARBON-TYPE RESIN | CARBON-TYPE RESIN | CARBON-TYPE RESIN |
| LIGHT WEIGHT | HIGH-COST MAGNET | CARBON-TYPE RESIN | CARBON-TYPE RESIN | CARBON-TYPE RESIN |
| TORQUE | HIGH-COST MAGNET | METAL, CARBON-TYPE RESIN, CERAMICS | CARBON-TYPE RESIN, CERAMICS | CARBON-TYPE RESIN, CERAMICS |
| ROTATION | HIGH-COST MAGNET | CARBON-TYPE RESIN | CARBON-TYPE RESIN, CERAMICS | CARBON-TYPE RESIN, CERAMICS |
| ENVIRONMENT | FERRITE | NATURAL MATERIAL | NATURAL MATERIAL | NATURAL MATERIAL |

DURING LARGE TORQUE GENERATION

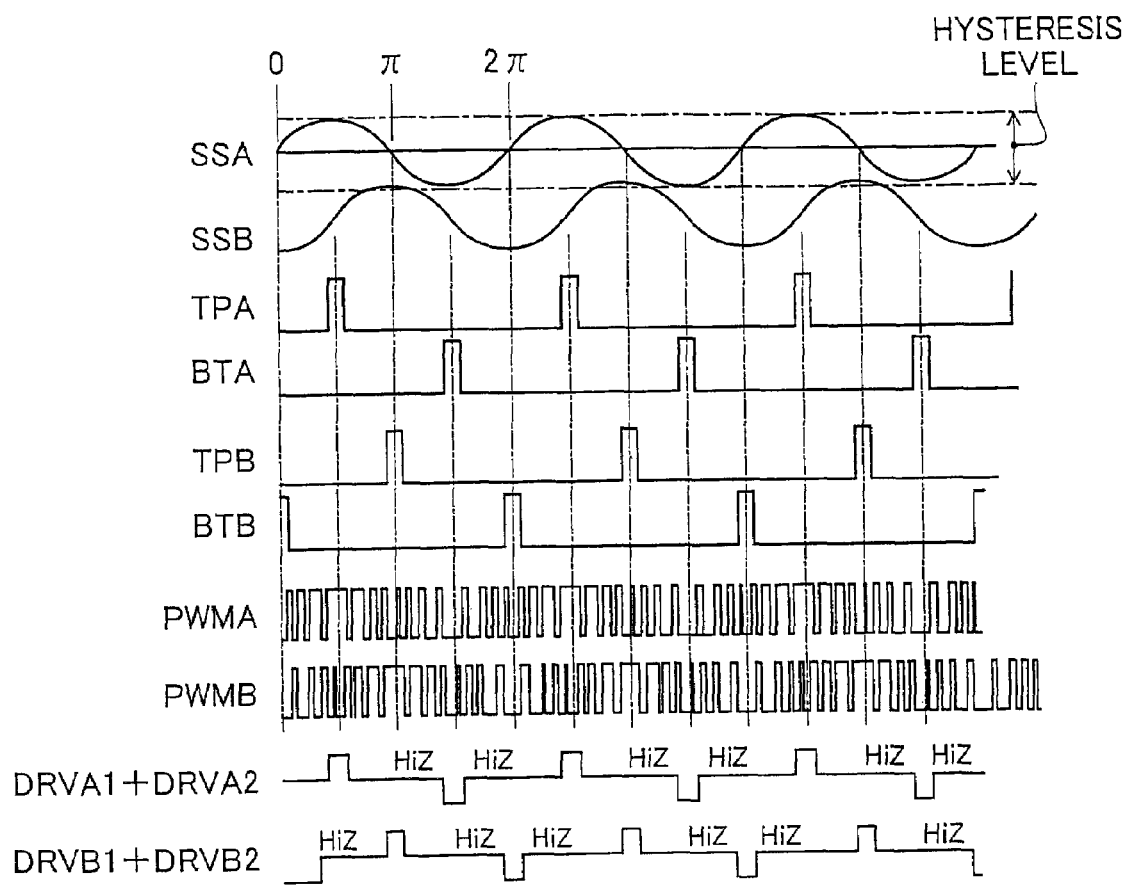

CHARACTERISTICS OF CONVENTIONAL DC BRUSH MOTOR

CHARACTERISTICS OF MOTOR OF THE FIRST EMBODIMENT

TEST 1
MAGNETIC FLUX ON BOTH SURFACES IS IN OPEN STATE

TEST 2
YOKE UNIT IS USED ON THE OPPOSITE SURFACE
TO CLOSE MAGNETIC FLUX

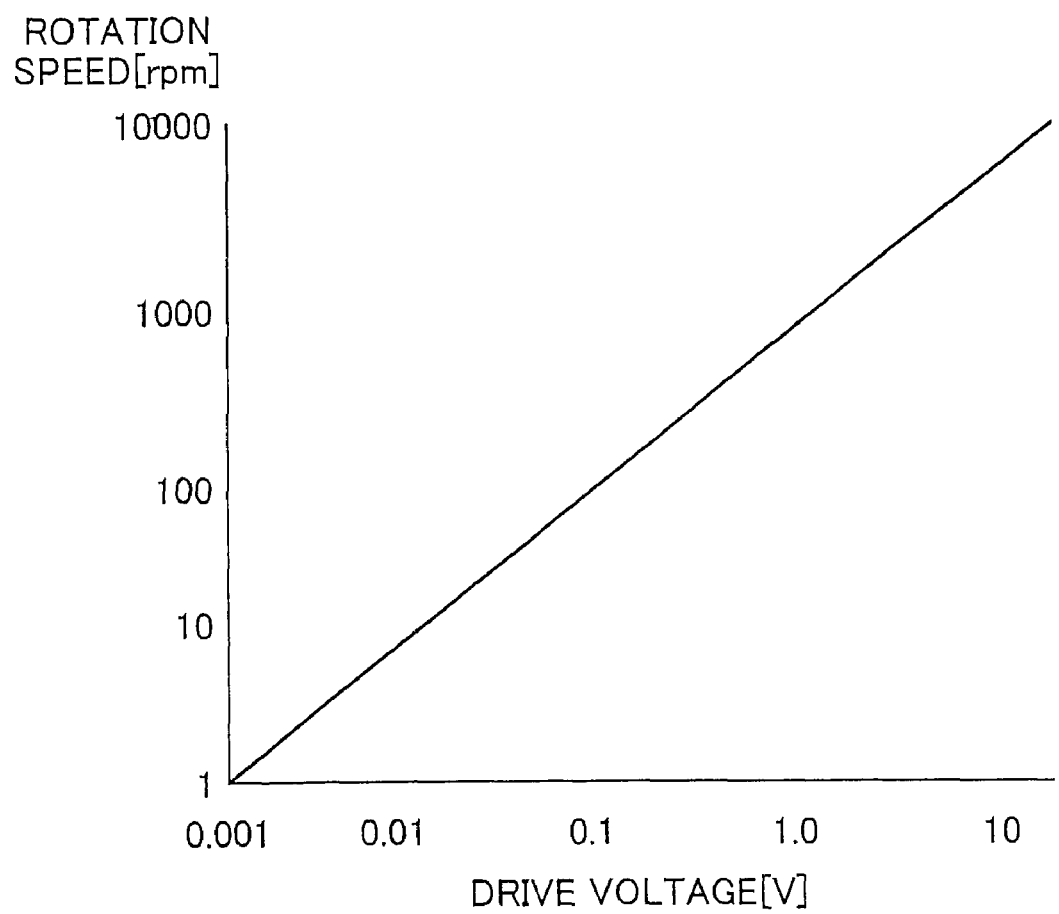

INSERT ROTOR STRUCTURE

A-A' SECTION

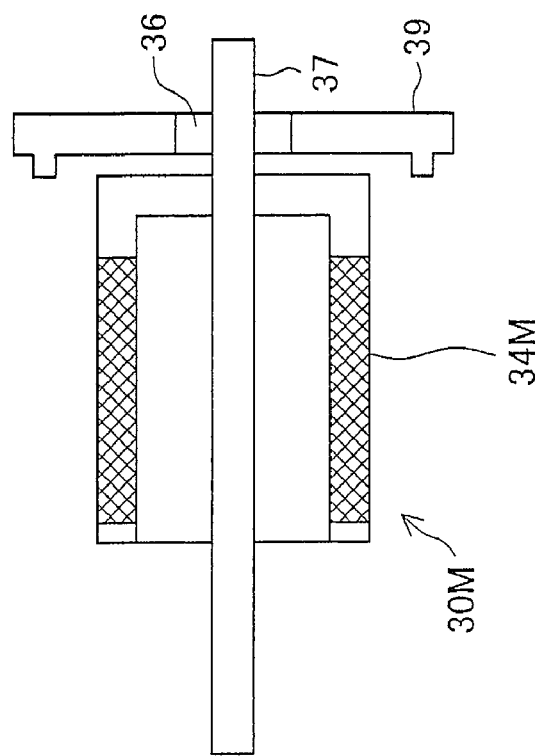
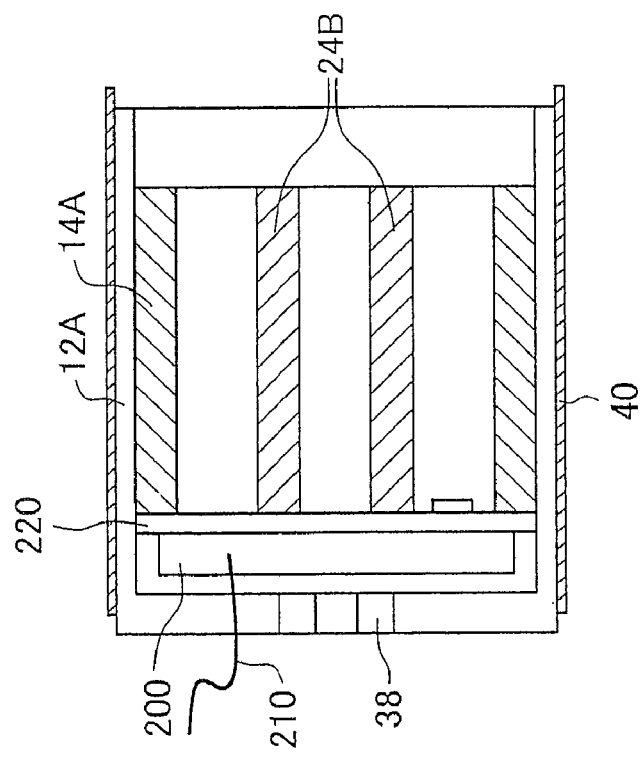
Fig.14(A) STATOR
Fig.14(B) ROTOR

FIRST MODIFICATION EXAMPLE OF TWO-PHASE MOTOR
IMMEDIATELY BEFORE PHASE = $2\pi$ (Polarity of A phase is inverted at $2\pi$.)

PHASE = $\pi/4$

IMMEDIATELY BEFORE PHASE = $\pi/2$ (Polarity of B phase is inverted at $\pi/2$.)

PHASE = $3\pi/4$

SECOND MODIFICATION EXAMPLE OF TWO-PHASE MOTOR
IMMEDIATELY BEFORE PHASE = $2\pi$ (Polarity of A phase is inverted at $2\pi$.)

PHASE = $\pi/4$

IMMEDIATELY BEFORE PHASE = $\pi/2$ (Polarity of B phase is inverted at $\pi/2$.)

IMMEDIATELY BEFORE PHASE = $3\pi/4$

THIRD MODIFICATION EXAMPLE OF TWO-PHASE MOTOR
IMMEDIATELY BEFORE PHASE = $2\pi$ (Polarity of A phase is inverted at $2\pi$.)

PHASE = $\pi/4$

IMMEDIATELY BEFORE PHASE = $\pi/2$ (Polarity of B phase is inverted at $\pi/2$.)

IMMEDIATELY BEFORE PHASE = $3\pi/4$

FOURTH MODIFICATION EXAMPLE OF TWO-PHASE MOTOR
IMMEDIATELY BEFORE PHASE = $2\pi$ (Polarity of A phase is inverted at $2\pi$.)

PHASE = $\pi/4$

IMMEDIATELY BEFORE PHASE = $\pi/2$ (Polarity of B phase is inverted at $\pi/2$.)

IMMEDIATELY BEFORE PHASE = $3\pi/4$

FIFTH MODIFICATION EXAMPLE OF TWO-PHASE MOTOR
IMMEDIATELY BEFORE PHASE = $2\pi$ (Polarity of A phase is inverted at $2\pi$.)

PHASE = $\pi/4$

IMMEDIATELY BEFORE PHASE = $\pi/2$ (Polarity of B phase is inverted at $\pi/2$.)

IMMEDIATELY BEFORE PHASE = $3\pi/4$

THIRD EMBODIMENT (THREE-PHASE MOTOR)
IMMEDIATELY BEFORE PHASE = $2\pi$ (Polarity of A phase is inverted at $2\pi$.)

IMMEDIATELY BEFORE PHASE = $\pi/3$ (Polarity of C phase is inverted at $\pi/3$.)

IMMEDIATELY BEFORE PHASE = $2\pi/3$ (Polarity of B phase is inverted at $2\pi/3$.)

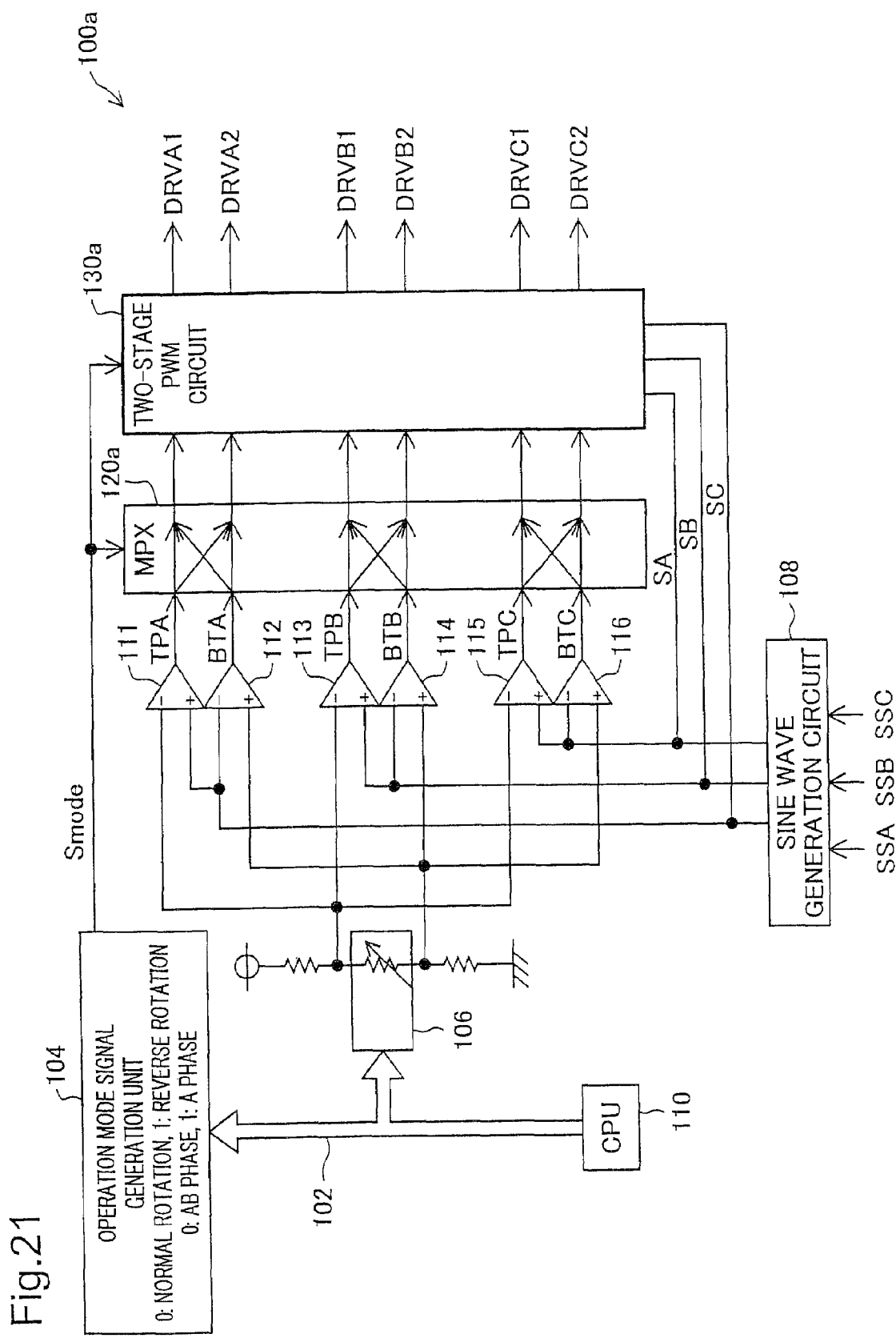

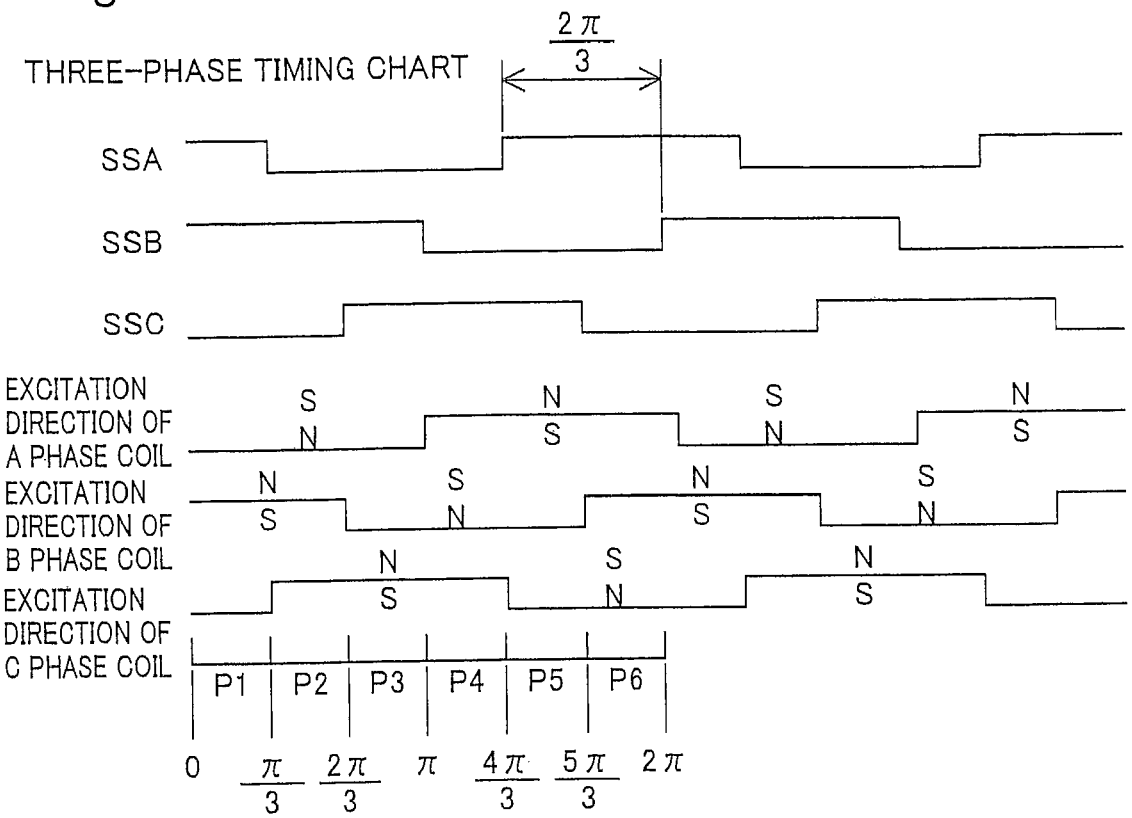

INTERVAL P1

INTERVAL P2

INTERVAL P3

INTERVAL P4

INTERVAL P5

INTERVAL P6

ELECTRIC MACHINE

RELATED APPLICATIONS

This application is a continuation patent application of U.S. Ser. No. 10/556,367 filed Nov. 10, 2005, which is a National Phase Application of PCT/JP2004/007072 filed May 18, 2004, all of which are incorporated by reference herein in their entirety.

TECHNICAL FIELD

The present invention relates to an electric machine such as an electric motor or a generator.

BACKGROUND ART

Electric motors can be of two types: synchronous motors and induction motors. Furthermore, based on the difference in rotors, the motors can be classified into motors of a magnet type using permanent magnets, motors of a winding type comprising wound coils, and motors of a reactance type using a ferromagnetic body such as iron. In the motor of a magnet type, the permanent magnet of the rotor is pulled into the rotary magnetic field of the stator and rotated.

A small synchronous motor described in Japanese Patent Application Laid-open No. H8-51745 is an example of a magnet-type synchronous motor. This small synchronous motor comprises a stator core having an excitation coil wound thereabout and a rotor comprising a magnet.

However, the problem associated with the conventional motors was that the weight increased proportionally to the generated torque and an attempt to increase the generated torque resulted in increased size.

DISCLOSURE OF THE INVENTION

It is an object of the present invention to provide an electric machine with a structure different from that of the conventional ones.

A first electric machine according to the present invention comprises: a first coil group including a plurality of electrically interconnected coils disposed along a predetermined direction at a predetermined pitch; a second coil group including a plurality of electrically interconnected coils disposed along the predetermined direction at a predetermined pitch, the second coil group having a fixed relative position with the first coil group; and a magnet group including at least one magnet, wherein N poles and S poles are disposed alternately opposite the first and second coil groups and a relative position of the magnet group with the first and second coil groups is changeable along the prescribed direction. The first and second coil groups are disposed at positions that are out of phase with each other by an odd multiple of $\pi/2$ in electrical angles. The coils in the first and second coil groups have substantially no magnetic material cores, and the electric machine has substantially no magnetic material yoke for forming a magnetic circuit.

Since this electric machine has substantially no core made from a magnetic material or yoke made from a magnetic material, it has a small weight, and when used as an actuator, it has excellent balance of torque and weight. Further, because the electric machine has no core made from a magnetic material, cogging does not occur and stable smooth rotation is possible. Moreover, because the electric machine has substantially no yoke made from a magnetic material, the iron loss (eddy current loss) is almost zero and an electric machine with good efficiency can be realized.

The electric machine may further comprise a case for housing the first and second coil groups and the magnet group, wherein each of the coils in the first and second coil groups may be wound around a support member formed from a substantially nonmagnetic and non-electroconductive material, and the case may be formed from a substantially nonmagnetic and non-electroconductive material.

With such a configuration, an electric machine practically without iron loss or cogging can be realized.

In the above electric machine, structural members with exception of shafts and bearings may be formed from substantially nonmagnetic and non-electroconductive material.

With such a configuration, the weight can be further decreased and the iron loss can be further reduced.

The plurality of coils in each coil group may be interconnected in such a manner that adjacent coils belonging to the same coil group are always excited with mutually opposite polarities.

Furthermore, the first and second coil groups may be disposed on opposite sides of the magnet group so that the magnet group lies therebetween.

With such a configuration, a large torque can be attained because magnetic fluxes on both sides of the magnet group are effectively utilized.

The electric machine may a rotary motor or a rotary generator, in which the coil groups and the magnet group rotate relative to each other in accordance with the predetermined direction, and the number of coils in the first coil group, the number of coils in the second coil group, and the number of magnets in the magnet group may be all equal.

With such a configuration, a motor with a high efficiency and a large torque can be realized.

The electric machine may further comprises a drive signal generation circuit for supplying a first AC drove signal to be supplied to the first coil group and a second AC drive signal to be supplied to the second coil group, wherein the drive signal generation circuit generates the first and second AC drive signals so that polarity of each coil in the first and second coil groups are switched when center of each coil is opposite to one of centers of the magnets in the magnet group, and that magnetic flux density in each coil group reaches a maximum value at a timing when midway points between two adjacent coils in the coil group are opposite to the centers of the magnets in the magnet group.

With such a configuration, the electric machine can be driven synchronously with the drive signals.

It is preferable that the drive signal generation circuit can reverse an operation direction of the first and second coil groups and the magnet group by reversing the electric current direction in the first and second coil groups.

Further, the drive signal generation circuit may includes first and second PWM circuits for generating first and second PWM signals, respectively, which are out of phase with each other by $\pi/2$; and a masking circuit for generating the first and second AC drive signals by masking the first and second PWM signals according to an output demand of the electric machine.

With such a configuration, the power of the electric machine can be adjusted by masking the PWM signals with the mask circuit.

The masking circuit may mask the PWM signals in temporal ranges that are symmetrically centered around a timing at which polarities of the AC drive signals are inverted.

Generally, the coils do not generate a very effective drive force close to the timing at which the polarity of each AC drive signal is inverted and the effective drive force tends to be generated close to the peak of the AC drive signals. Therefore, with the above-described configuration, the PWM signal is masked in the interval in which the coils do not generate an effective drive force. Therefore, the efficiency of the electric machine can be increased.

The electric machine may further comprise a regenerative circuit for regenerating electric power from the first and second coil groups, wherein the drive signal generation circuit and the regenerative circuit are capable of operating the electric machine in an operation mode in which a drive force is generated from one of the first and second coil groups while electric power is regenerated from the other coil group.

With such a configuration, the electric machine can be operated while simultaneously implementing the generation of drive force and regeneration of electric power according to demands.

The first and second coil groups may be disposed on first and second cylindrical members constituting a hollow double-wall cylindrical structure, and the magnet group may be disposed on a third cylindrical member inserted between the first and second cylindrical members.

With such a configuration, it is possible to obtain an electric machine with high resistance to vibrations during rotor (first and second coil groups or a magnet group) rotation.

A second electric machine according to the present invention comprises: a first coil group including a plurality of electrically interconnected coils disposed along a predetermined direction at a predetermined pitch; a second coil group including a plurality of electrically interconnected coils disposed along the predetermined direction at a predetermined pitch, the second coil group having a fixed relative position with the first coil group; a third coil group including a plurality of electrically interconnected coils disposed along the predetermined direction at a predetermined pitch, the second coil group having a fixed relative position with the first and second coil groups; and a magnet group including at least one magnet, wherein N poles and S poles are disposed alternately opposite the first, second and third coil groups and a relative position of the magnet group with the first, second and third coil groups is changeable along the prescribed direction. The first, second and third coil groups are disposed at positions that are successively out of phase with one another by $2\pi/3$ in electrical angles. The coils in the first, second and third coil groups have substantially no magnetic material cores, and the electric machine has substantially no magnetic material yoke for forming a magnetic circuit.

With such a configuration, too, an electric machine with excellent balance of torque and weight can be realized. Furthermore, it is possible to realize an electric machine with stable and smooth rotation in which no cogging is generated, this machine having good efficiency and practically no iron loss.

The present invention can be implemented in a variety of modes. For example, it can be implemented in the modes of an electric actuator, an electric motor such as a linear motor or rotation motor, a generator, actuators or motors thereof, a method for driving a generator, and a drive apparatus.

BRIEF DESCRIPTION OF THE DRAWINGS

FIG. 5 is an explanatory drawing illustrating the relationship between the application of the electric actuator as an embodiment of the present invention and the preferred materials.

FIG. 9 is a timing chart illustrating the signal waveform during small torque generation in the motor of the first embodiment.

FIG. 12 is a graph illustrating the rotation speed during no-load operation of the motor of the first embodiment.

FIGS. 14(A) and 14(B) are cross-sectional views illustrating the configuration of the stator and rotor of the second embodiment.

FIG. 21 is a block diagram illustrating the configuration of the drive signal generation circuit of the third embodiment.

FIG. 23 is a timing chart illustrating the sensor signals and the excitation direction of coils of each phase of the third embodiment.

BEST MODE FOR CARRYING OUT THE INVENTION

The modes for carrying out the invention will be explained in the order as follows.
First embodiment (two-phase motor).
Second embodiment (two-phase motor).
Various modification examples of the two-phase motor.
Third embodiment (three-phase motor).
Fourth embodiment.
Other modification examples.

First Embodiment

Two-Phase Motor

Figure 1A:
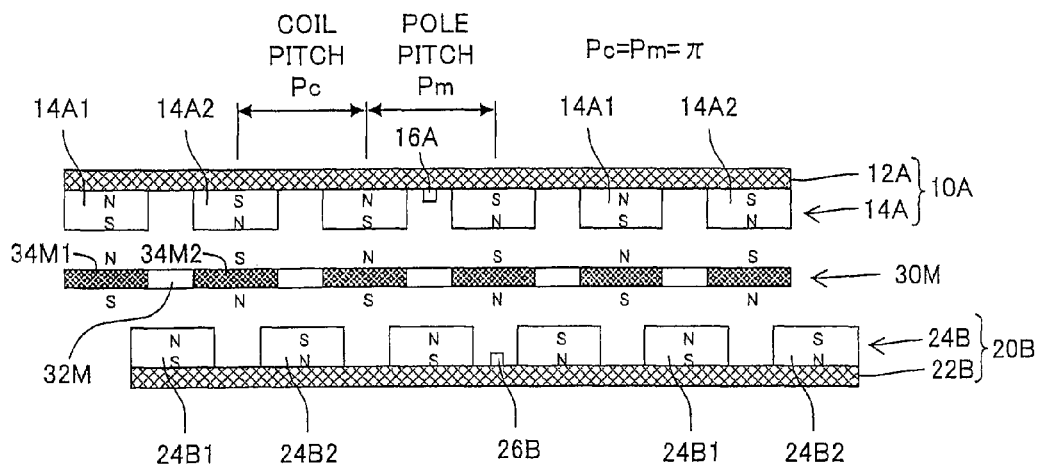
FIGS. 1(A) and 1(B) are explanatory drawings illustrating schematic configurations of the electric motor of the first embodiment of the present invention.

FIG. 1(A) is an explanatory drawing illustrating a schematic configuration of an electric motor of the first embodiment of the present invention. This electric motor comprises a first coil group structure 10A, a second coil group structure 20B, and a magnet group structure 30M.

The first coil group structure 10A comprises a support member 12A and an A-phase coil group 14A fixed to the support member 12A. In the A-phase coil group 14A, the coils 14A1, 14A2 of two types excited in the opposite directions are alternately disposed with a constant pitch Pc. In the state shown in FIG. 1(A), the three coils 14A1 are so energized that their magnetization direction is a downward direction (direction from the N pole to the S pole), and the three coils 14A2 are energized so that their magnetization direction is an upward direction.

The second coil group structure 20B also comprises a support member 22B and a B-phase coil group 24B fixed to the support member 22B. In the B-phase coil group 24B, too, the coils 24B1, 24B2 of two types that are excited in the opposite directions are alternately disposed with a constant pitch Pc. In the present specification, the term "coil pitch Pc" is defined as a pitch between the coils in the A-phase coil group or the pitch between the coils in the B-phase coil group.

The magnet group structure 30 comprises a support member 32 and a magnet group 34M fixed to the support member 32M. The permanent magnets of the magnet group 34 are so disposed that the magnetization direction is oriented perpendicularly to the arrangement direction (left-right direction shown in FIG. 1(A)) of the magnet group 34M. The magnets of the magnet group 34 are disposed with a constant pole pitch Pm. In the present example, the pole pitch Pm is equal to the coil pitch Pc and is equivalent to $\pi$ in terms of an electric angle. The electric angle of $2\pi$ is associated with a mechanical angle or distance through which the magnet group structure moves when the phase of the drive signal of the motor changes through $2\pi$. In the first embodiment, if the phase of the drive signal of the A-phase coil group 14A and B-phase coil group 24B changes through $2\pi$, the magnet group structure 30M moves through twice coil pitch Pc.

Further, the A-phase coil group 14A and B-phase coil group 24B are located in positions that are shifted with respect to each other by $\pi/2$ in terms of electric angle. Further, in other aspects, the A-phase coil group 14A and B-phase coil group 24B have substantially identical structures. Therefore, when a coil group is explained hereinbelow, the explanation will be provided only for the A-phase coil group, unless stated differently.

Figure 1B:
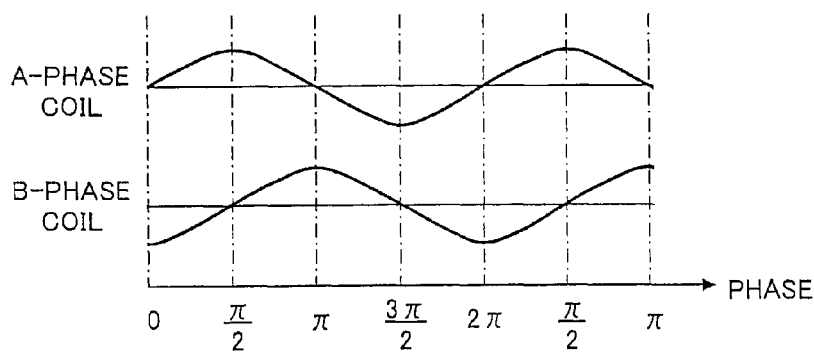

FIG. 1(B) shows an example of the waveform of the AC drive signal supplied to the A-phase coil group 14A and B-phase coil group 24B. Two-phase AC signals are respectively supplied to the A-phase coil group 14A and B-phase coil group 24B. The phases of the drive signals of the A-phase coil group 14A and B-phase coil group 24B are shifted by $\pi/2$ with respect to each other. The state shown in FIG. 1(A) corresponds to a state with a phase zero (or $2\pi$).

This electric motor further comprises a position sensor 16A for the A-phase coil group 14A and another position sensor 26B for the B-phase coil group 24B. Those sensors are hereinafter referred to as "A-phase sensor" and "B-phase sensor". The A-phase sensor 16A is disposed in a central position between two coils of the A-phase coil group 14A, and the B-phase sensor 26B is disposed in a central position between two coils of the B-phase coil group 24B. It is preferred that sensors with an analog output having a waveform similar to the AC drive signal shown in FIG. 1(B) be employed as those sensors 16A, 26B. For example, a Hall IC using a Hall effect can employed therefore. However, sensors having a digital output with a rectangular waveform also can be used. Further, a senseless drive without the position sensors is also possible.

The support members 12A, 22B, 32M are formed from a nonmagnetic material. It is preferable that among various components of the electric motor of the present embodiment, all the components other than the electric wiring including coils and sensors, magnets, rotary shaft, and bearings therefore be nonmagnetic and formed from non-conductive materials.

Figure 2A:
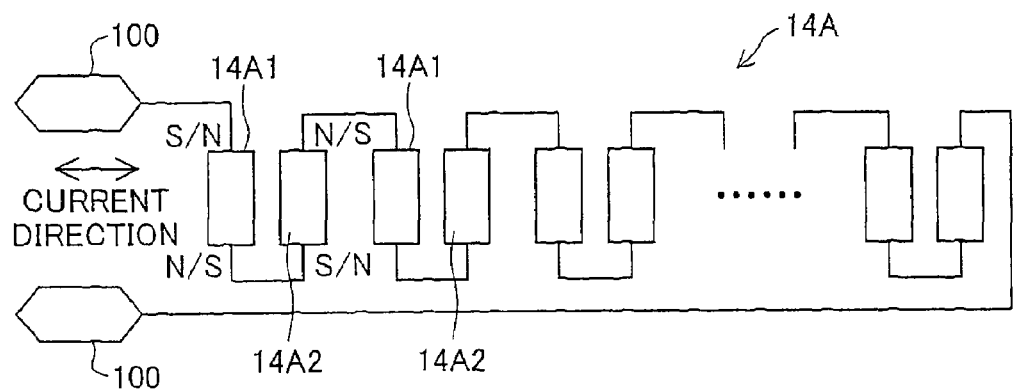
FIGS. 2(A) and 2(B) illustrate an example of a connection method of coils of two types in the A-phase coil group.
Figure 2B:
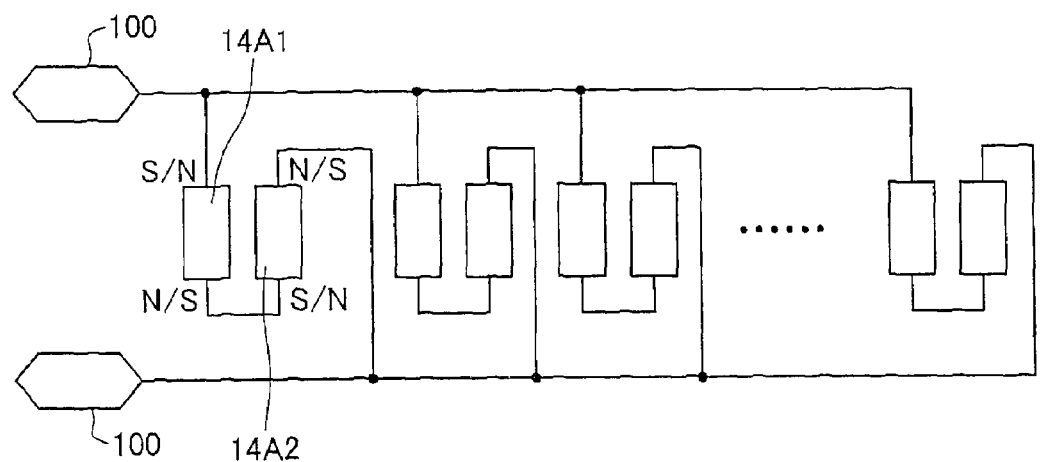

FIGS. 2(A) and 2(B) illustrate connection methods of two coils 14A1, 14A2 of the A-phase coil group 14A. With the connection method shown in FIG. 2(A), all the coils constituting the A-coil group 14A are connected in series to a drive signal generation circuit 100. On the other hand, with the connection method shown in FIG. 2(B), a plurality of serial connections composed of a pair of coils 14A1, 14A2 are connected in parallel. With any of those connection methods, the two coils 14A1, 14A2 are always magnetized to opposite polarity.

FIGS. 3(A) to 3(D) illustrate the operation of the electric motor of the first embodiment. In the first embodiment, the coil groups 14A, 24B are composed as a stator, and the magnet group 34M is composed as a rotor. Therefore, as shown in FIGS. 3(A) to 3(D), the magnet group 34M moves as the time elapses.

Figure 3A:
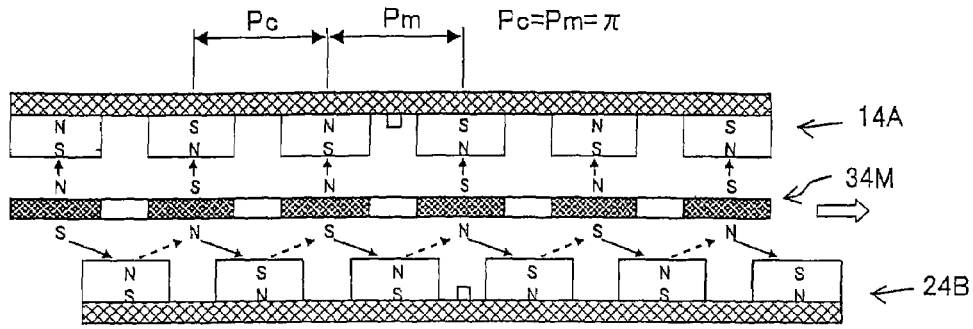
FIGS. 3(A) to 3(D) illustrate the operation of the electric motor of the first embodiment.

FIG. 3(A) shows a state of timing immediately before the phase is $2\pi$. The solid line arrows drawn between the coils and magnets indicate the direction of attraction forces, and the broken line arrows indicate the direction of repulsion force. In this state, the A-phase coil group 14A does not provide a drive force in the operation direction (direction to the right as shown in the figure) with respect to the magnet group 34M, and the magnetic force acts in the direction of pulling the magnet group toward the A-phase coil group 14A. Therefore, it is preferred that at the timing with a $2\pi$ phase, the voltage applied to the A-phase coil group 14A be zero. On the other hand, the B-phase coil group 24B provides a drive force in the operation direction with respect to the magnet group 34M. Further, the B-phase coil group 24B provides not only the attraction force, but also a repulsion force with respect to the magnet group 34M. Therefore, the net force in the up-down direction (direction perpendicular to the operation direction of the magnet group 34M) acting from the B-phase coil group 24B to the magnet group 34M is zero. As a result, at the timing with a $2\pi$ phase, the voltage applied to the B-phase coil group 24B preferably assumes a peak value.

Figure 3B:
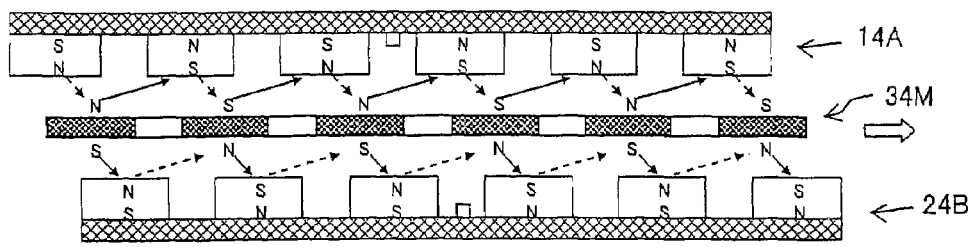
Figure 3C:
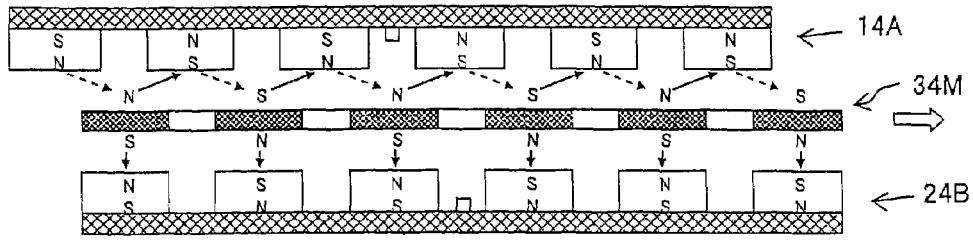
Figure 3D:
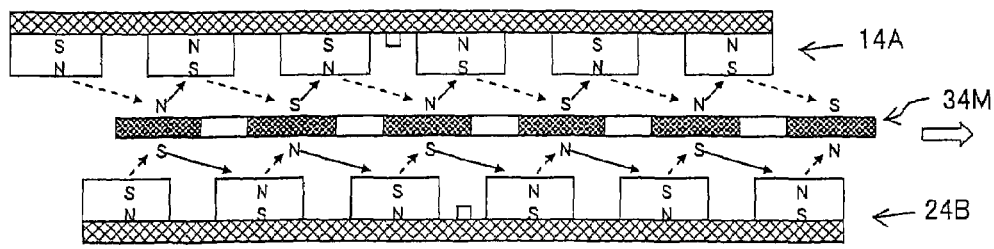

As shown in FIG. 1(B), at the timing with a $2\pi$ phase, the polarity of the A-phase coil group 14A is inverted. FIG. 3(B) shows a state with a $\pi/4$ phase. In this state the polarity of the A-phase coil group 14A is inverted with respect to that shown in FIG. 3(A). In this state, the A-phase coil group 14A and B-phase coil group 24B provide the same drive force in the operation direction of the magnet group 34M. FIG. 3(C) shows a state immediately before a $\pi/2$ phase. In this state, conversely to the state shown in FIG. 3(A), only the A-phase coil group 14A provides a drive force in the operation direction to the magnet group 34M. At the timing with a $\pi/2$ phase, the polarity of the B-phase coil group 24B is inverted and the polarity shown in FIG. 3(D) is assumed. FIG. 3(D) shows a state with a $3\pi/4$ polarity. In this state, the A-phase coil group 14A and B-phase coil group 24B provide the same drive force in the operation direction of the magnet group 34M.

As can be easily understood from FIGS. 3(A) to 3(D), the polarity of the A-phase coil group 14A is switched at the timing at which each coil of the A-phase coil group 14A is located opposite the respective magnets of the magnet group 34M. The same is true for the B-phase coil group. As a result, a drive force can be almost constantly generated from all the coils and a large torque can be generated.

The interval with a $\pi$ to $2\pi$ phase is almost identical to that illustrated by FIGS. 3(A) to 3(D) and the explanation thereof is herein omitted. However, the polarity of the A-phase coil group 14A is again inverted at the timing with a $\pi$ phase, and the polarity of the B-phase coil group 24B is again inverted at the timing with a $3\pi/2$ phase.

As can be easily understood from the explanation above, in the electric motor of the present embodiment, a drive force in the operation direction is obtained for the magnet group by using the attraction forces and repulsion forces between the coil groups 14A, 24B and the magnet group 34M. In particular, in the present embodiment, since the coil groups 14A, 24B are disposed on both sides so as to sandwich the magnet group 34M, the magnetic flux on both sides of the magnet group can be used to generate the drive force. Therefore, the utilization efficiency of the magnetic flux is higher than in the case where only one side of the magnets is used to generate the drive force, as in the conventional electric motors, and a motor with good efficiency and high torque can be realized.

Furthermore, in the motor of the present embodiment, since no core made from a magnetic material is provided, the so-called cogging does no occur and a smooth stable operation can be realized. Further, since a yoke for constituting the magnetic circuit is not provided, the so called iron loss (eddy current loss) is extremely small and a motor with good efficiency can be realized.

Further, in the usual motor that, the utilization efficiency of magnetic flux is thought to decrease if a core or yoke is absent. On the other hand, in the electric motor of the present embodiment, because the coil groups 14A, 24B are disposed on both sides so as to sandwich the magnet group 34M, the utilization efficiency of magnetic flux is sufficiently high and it is not necessary to provide a core or yoke. The core or yoke causes cogging and increases weight. Therefore, it is preferred that no core or yoke be used. Another advantage of eliminating the yoke is that the iron loss is zero and a high motor efficiency can be obtained.

Figure 4A:
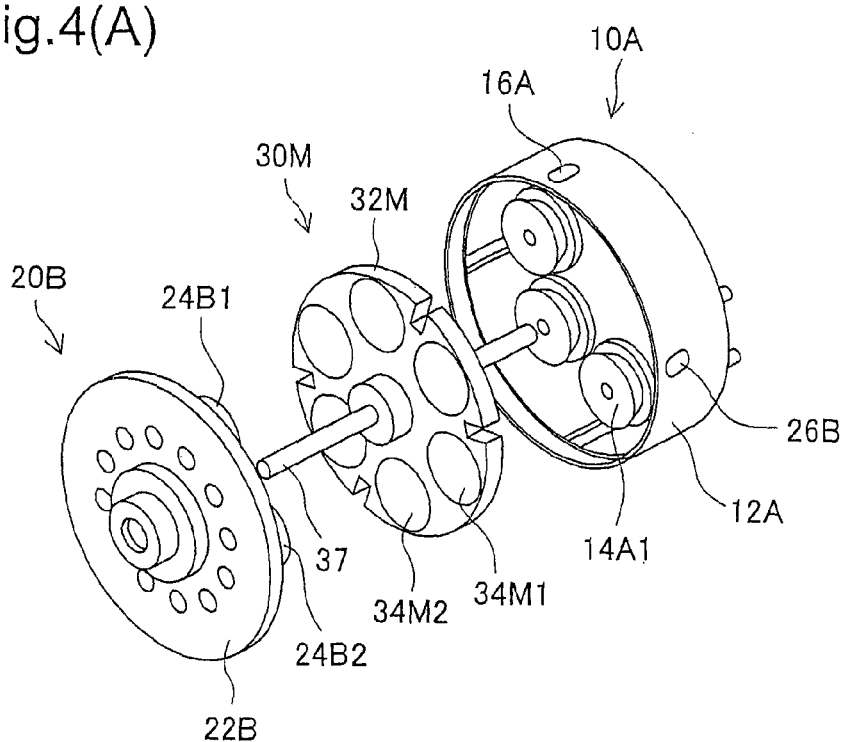
FIGS. 4(A) to 4(E) illustrate the mechanical structure of the electric motor of the first embodiment.
Figure 4B:
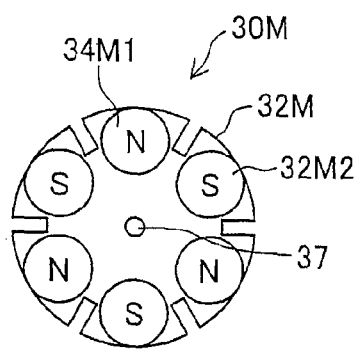
Figure 4D:
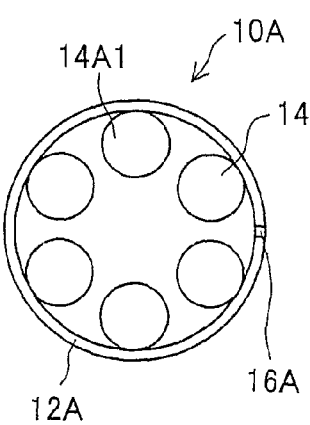
Figure 4E:
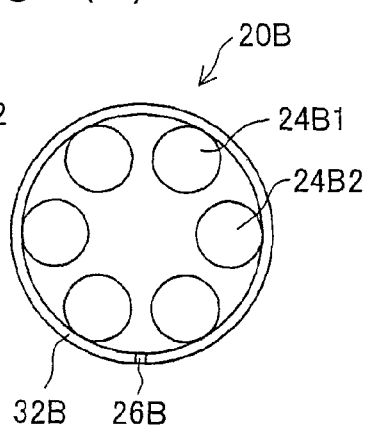
Figure 4C:
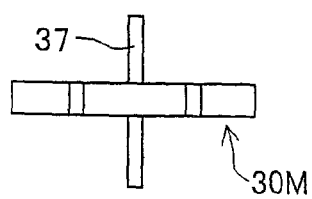

FIG. 4(A) is a perspective view of the electric motor of the first embodiment. FIG. 4(B) is a plan view of a rotor (magnet group structure) 30M, FIG. 4(C) is a side view thereof, FIG. 4(D) is a plan view of the A-phase coil group structure 10A, and FIG. 4(E) is a plan view of the B-phase coil group structure 20B.

The A-phase coil group structure 10A and B-phase coil group structure 20B constitute a stator, and the magnet group structure 30M constitutes a rotor. Thus, the magnet group structure 30M is disposed between the A-phase coil group structure 10A and B-phase coil group structure 20B, so that the magnet group structure can rotate about a shaft 37 as a center. The rotary shaft 37 is press fit into the opening for a rotary shaft located in the center of the rotor 30M, so that the rotor 30M and rotary shaft 37 can be rotate together. As shown in FIGS. 4(B), 4(D), and 4(E), in the rotor 30M, a total of six permanent magnets 34M are provided equidistantly in the circumferential direction in the support member 32M of a disk-like shape. Furthermore, in the A-phase coil group structure 10A, a total of six electromagnetic coils 14A1, 14A2 are provided equidistantly in the circumferential direction in the support member 12A. Similarly, in the B-phase coil group structure 20B, a total of six electromagnetic coils 24B1, 24B2 are provided equidistantly in the circumferential direction in the support member 22B. As can be easily understood from this explanation, the operation direction (left-right direction in FIG. 1(A)) of the magnet group structure 30M shown in FIG. 1(A) corresponds to the rotation direction of the rotor.

The support member 12A of the A-phase coil group structure 10A is formed as a hollow cylindrical case. The bottom surface (side which is not seen in FIG. 4(A)) on one side of the hollow cylindrical case is closed, and the bottom surface on the other side is open. The A-phase sensor 16A and B-phase sensor 26B are provided on the side surface of the case 12A. The positions of those sensors 16A, 26A are identical to the positions shown in FIG. 1(A). The support member 22B of the B-phase coil group structure 20B is formed as a lid of the case 12A.

FIG. 5 illustrates the relationship between the preferred materials and applications of the electric actuator as an embodiment of the present invention. In various applications, the following items may be considered as most important.

Low cost.
Small size.
Low power consumption.
Endurance against vibrations and shocks.
Suitability for high-temperature environment.
Light weight.
Ability to generate a large torque.
Capability of high-speed rotation.
Environmental friendliness.

The right column of applications in FIG. 5 shows the materials suitable for the permanent magnet, rotor material (support member 32M of the magnet group), bobbin material (core material of the coils), and case material (support members 12A, 14B). The "high-cost magnet", as referred to in the figure, means a neodymium magnet, samarium-cobalt magnet, and alnico magnet. The "typical resin" means various resins (in particular, synthetic resins), excluding carbon-type resins and vegetable resins. The "carbon-type resin" means glassy carbon, carbon fiber reinforced resin (CFRP), and carbon fibers. Aluminum, stainless steel, titanium, magnesium, copper, silver, gold, and alloys thereof can be used as the metal for the rotor material. Fine ceramics, steatite ceramics, alumina, zircon, and glass can be used as the "ceramics". Materials (usually, vegetable resins) such as plants, wood materials, and clay can be used as the "natural materials".

As can be easily understood from those examples, in the electric actuator of the present embodiment of the present invention, various nonmagnetic nonconductive materials can be used as the rotor materials, bobbin materials (core materials) and case materials. However, in certain cases, in order to increase strength, metal materials such as aluminum and alloys thereof are used as the rotor materials (support member 32M of the magnet group). Actually, in the first embodiment, aluminum is used as the rotor material. In this case, too, it is preferred that the bobbin and casing be formed from substantially nonmagnetic nonconductive materials. Here, the expression "substantially nonmagnetic nonconductive materials" means that very small portions are allowed to be magnetic or conductive. For example, whether the bobbin has been formed from a substantially nonmagnetic nonconductive material can be determined by the presence or absence of cogging in the motor. Further, whether the case has been formed from a substantially nonmagnetic nonconductive material can be determined by whether the iron loss (eddy current loss) caused by the case material is below the prescribed value (for example, 1% of the input).

Among the structural components of the electric actuator, there are some components that are preferably fabricated from metal materials, the rotary shaft and bearings being the examples of such components. The term "structural components" as used herein means components used to support the shape of the electric actuator and means main components that do not include small parts or fixing elements. The rotor and casing are the typical structural components. In the electric actuator in accordance with the present invention, main structural components other than the rotary shaft and bearings are preferably formed from nonmagnetic nonconductive materials.

Figure 6:
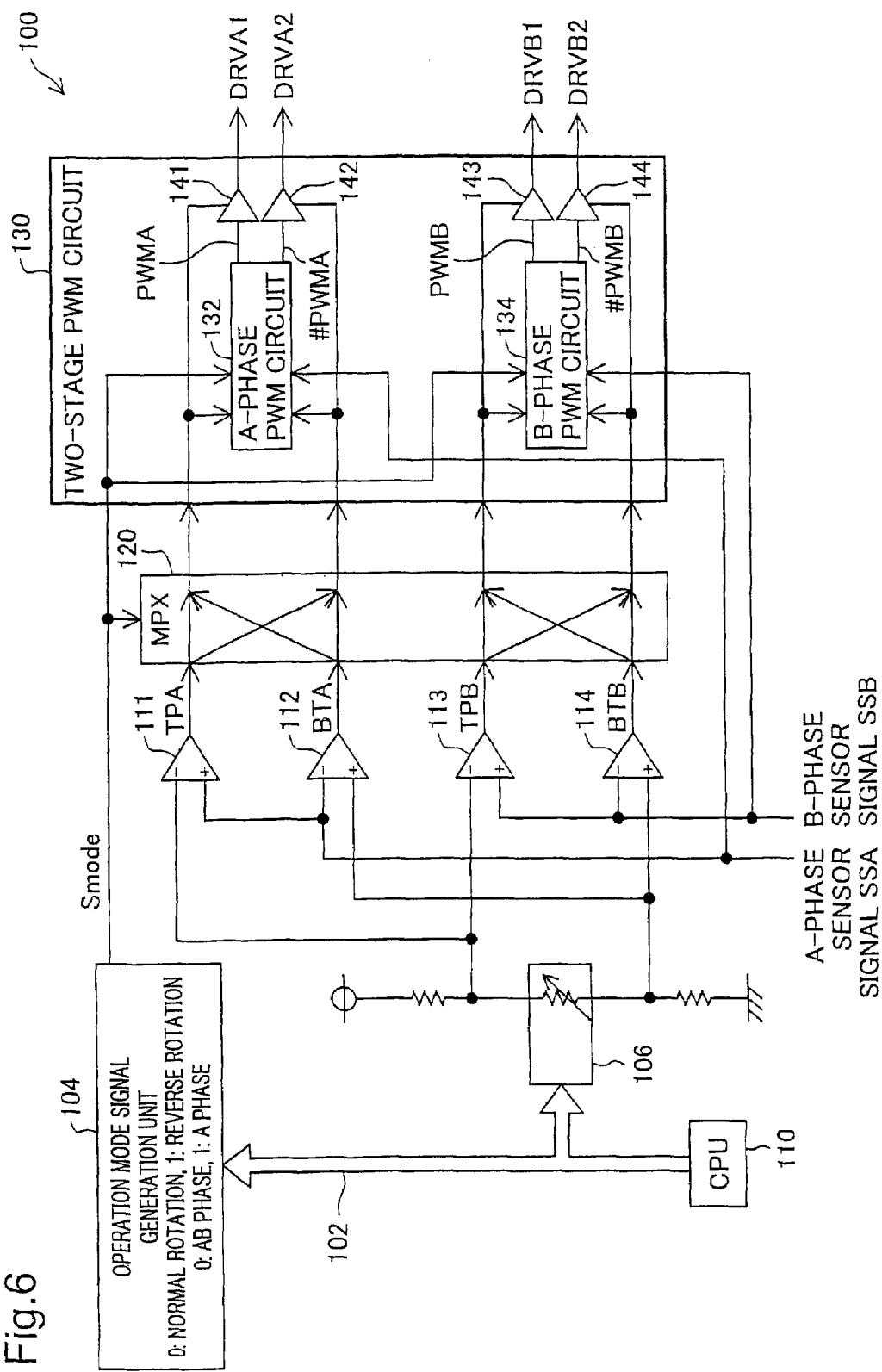
FIG. 6 is a block diagram illustrating the configuration of the drive signal generation circuit in the first embodiment.

FIG. 6 shows the configuration of the dive signal generation circuit 100 of the first embodiment. This circuit 100 comprises an operation mode signal generating unit 104 connected to a bus 102, an electronically variable resistor 106, and a CPU 110. The operation mode signal generating unit 104 generates an operation mode signal Smode. The operation mode signal Smode comprises the first bit indicating whether the rotation is normal or reversed and the second bit indicating an operation mode in which both the A-phase and the B-phase are used or an operation mode in which only the A-phase is used. Further, during start of the motor, the coil groups of A-phase and B-phase are used to determine reliably the rotation direction. However, after the motor operation has been started, in the operation state with a small required torque, sufficient rotation can be maintained by using only one of the A-phase coil group and B-phase coil group. The second bit of the operation mode signal Smode is a flag for indicating that only the A-phase coil group is driven in this case.

The voltage across the electronically variable resistor 106 is applied to one input terminal of four voltage comparators 111 to 114. The A-phase sensor signal SSA and B-phase sensor signal SSB are supplied to the other input terminal of the voltage comparators 111 to 114. The output signals TPA, BTA, TPB, and BTB of the four voltage comparators are called "mask signals" or "permission signals". Meaning of those names will be described below.

The mask signals TPA, BTA, TPB, and BTB are inputted into a multiplexer 120. The multiplexer 120 switches the output terminals of the mask signals TPA, BTA for the A-phase according to the operation mode signal Smode and also switches the output terminal of the mask signals TPB, BTB for the B-phase thereby making it possible to reverse the rotation of the motor. The mask signals TPA, BTA, TPB, and BTB outputted from the multiplexer 120 are supplied to a two-stage PWM circuit 130.

The two-stage PWM circuit 130A comprises an A-phase PWM circuit 132, a B-phase PWM circuit 134, and four three-stage buffer circuits 141 to 144. The output signal SSA (referred to hereinbelow as "A-phase sensor signal") of the A-phase sensor 16A (FIG. 1(A)) and the operation mode signal Smode are supplied to the A-phase PWM circuit 132. The output signal SSB of the B-phase sensor 26B and the operation mode signal Smode are supplied to the B-phase PWM circuit 134. Those two PWM circuits 132, 134 are the circuits for generating the PWM signal PWMA, #PWMA, PWMB, #PWMB responsive to the sensor signals SSA, SSB. The #PWMA, #PWMB signals are obtained by inverting the PWMA, PWMB signals. As described hereinabove, the two sensor signals SSA, SSB are sine signals, and the PWM circuits 132, 134 execute a well-known PWM operation according to those sine signals.

The signals PWMA, #PWMA generated in the A-phase PWM circuit 132 are supplied to two respective input terminals of the two three-stage buffer circuits 141, 142. The A-phase mask signals TPA, BTA are supplied from the multiplexer 120 to the control terminals of those three-stage buffer circuits 141, 142. The output signals DRVA1, DRVA2 of the three-stage buffer circuits 141, 142 are the drive signals for the A-phase coil group (referred to hereinbelow as "A1 drive signal" and "A2 drive signal"). Similarly for the B-phase, the drive signals DRVB1, DRVB2 for the B-phase coil group are generated by the PWM circuit 134 and three-stage buffer circuits 143, 144.

Figure 7:
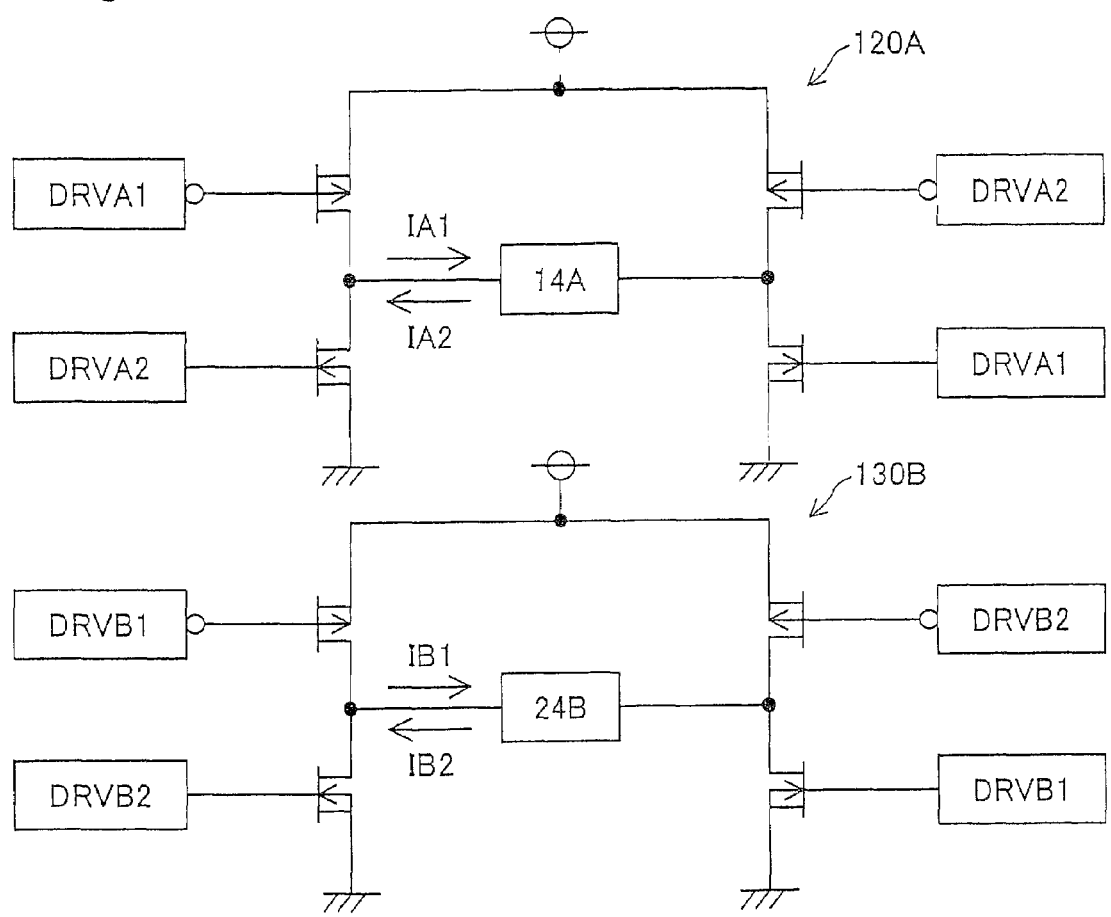
FIG. 7 is a block diagram illustrating the configuration of the driver circuit in the first embodiment.

FIG. 7 shows an A-phase driver circuit 120A and B-phase driver circuit 130B. The A-phase driver circuit 120A is an H-bridge circuit for supplying AC drive signals DRVA1, DRVA2 to the A-phase coil group 14A. White circles assigned to the terminal portions of the blocks indicating the drive signals represent a negative logic and indicate that the signals are inverted. Further, the arrows assigned with reference symbols IA1, IA2 indicate the direction of electric current flowing under the effect of A1-drive signal DRVA1 and A2-drive signal DRVA2. The configuration of the B-phase driver circuit 130B is identical to the configuration of the A-phase driver circuit 12A.

Figure 8:
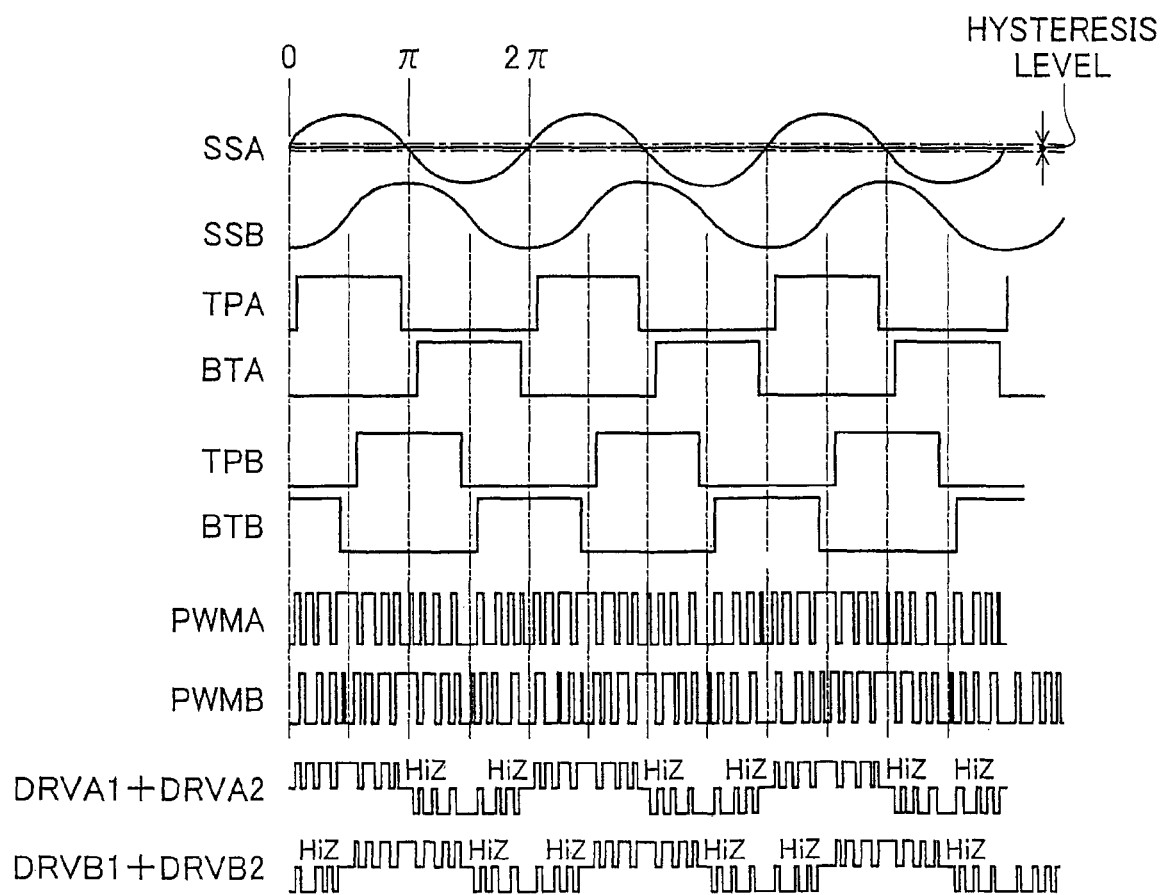
FIG. 8 is a timing chart illustrating the signal waveform during large torque generation in the motor of the first embodiment.

FIG. 8 is a timing chart illustrating various signal waveforms in the first embodiment. The A-phase sensor signal SSA and B-phase sensor signal SSB are sine signals with phases shifted by $\pi/2$ with respect to each other. The A-phase PWM circuit 132 generates a signal PWMA (seventh signal from the top in FIG. 8) having an average voltage proportional to the level of the A-phase sensor signal SSA. The first A-phase mask signal TPA permits the application of the signal PWMA to the A-phase coil group 14A within an interval in which the signal TPA is at an H level and inhibits this application in the interval of an L level. Similarly, the second A-phase mask signal BTA permits the application of the signal PWMA to the A-phase coil group 14A within an interval in which the signal BTA is at an H level and inhibits this application in the interval of an L level. The first A-phase mask signal TPA assumes an H level when the PWM signal PWMA is on a plus side, and the second A-phase mask signal BTA assumes an H level when the PWM signal PWMA is on the minus side. As a result, the drive signal (DRVA1+ DRVA2), such as the second signal form the bottom in FIG. 8, is applied to the A-phase coil group 14A. As can be easily understood from this explanation, the A-phase mask signals TPA, BTA can be considered as signals permitting the application of the PWM signal PWMA to the A-phase coil group 14A. Furthermore, they can be also considered as the signals masking the PWM signal PWMA and preventing it from being supplied to the A-phase coil group 14A. The same is true for the B-phase.

Further, FIG. 8 illustrates the operation state in the case a large torque is generated. At this time, the period in which both mask signals TPA and BTA are at an L level is small.

Therefore, a voltage is almost always applied to the A-phase coil group 14A. Further, a hysteresis level in this example is indicated at the right end of the waveform of the A-phase sensor signal SSA. The "hysteresis level" means the range of ineffective (that is, those that are not used) signal levels in the vicinity of the zero level of the sine signal. It is clear that when a large torque is generated, the hysteresis level is extremely small. The hysteresis level can be changed by changing the resistance of the electronically variable resistor 106, thereby changing the duty ratio of the mask signals TPA, BTA, TPB, BTB.

FIG. 9 shows the operation state when a small torque is generated. The small torque means a high-speed rotation. At this time, the duty factor of the mask signals TPA, BTA, TPB, and BTB is set lower than those shown in FIG. 8, and the number of pulses of the drive signals (DRVA1+DRVA2), (DRVB1+DRVB2) of each coil are decreased accordingly. Furthermore, the hysteresis level is increased.

Further, as can be easily understood from the comparison of FIG. 8 and FIG. 9, the H-level interval of the first A-phase mask signal TPA has a symmetric shape with respect to the timing (point in time with a $\pi/2$ phase) in which the A-phase sensor signal SSA assumes a maximum value. Similarly, the H-level interval of the second A-phase mask signal BTA has a symmetric shape with respect to the timing (point in time with a $3\pi/2$ phase) in which the A-phase sensor signal SSA assumes a minimum value. Thus, the interval in which those mask signals TPA and BTA are at ah H-level has a symmetric shape with respect to the timing in which the A-phase sensor signal SSA assumes a peak value. In other words, it can be thought that the masking interval of the PWM signal PWMA is set so that the signal PWMA is masked within a time interval centered on the timing ($\pi$ and $2\pi$) at which the polarity of the AC drive signal (waveform shown in FIG. 1(B)) simulated by the signal PWMA is inverted.

Here, as explained with reference to FIG. 3(A), the A-phase coil group 14A does not generate a very effective drive force when the phase is in the vicinity of $2\pi$. The same is true when the phase is close to $\pi$. Furthermore, the A-phase coil group 14A generates an effective drive force with the best efficiency when the phase is close to $\pi/2$ and $3\pi/2$. As shown in the above-described FIG. 9, when the required output of the motor is small, the two-stage PWM circuit 130 of the present embodiment does not apply a voltage to the A-phase coil group 14A when the phase is in the vicinity of $\pi$ and $2\pi$ and, as shown in FIG. 8 and FIG. 9, and it applies a voltage to the A-phase coil group 14A when the phase is close to $\pi/2$ and $3\pi/2$ as a center. Thus, the A-phase mask signals TPA, BTA masks the PWM signal PWMA so as to use preferentially an interval in which the A-phase coil group 14A generates the drive force with the highest efficiency. Therefore, the motor efficiency can be increased. Further, if a voltage is applied to the A-phase coil group 14A when the phase is in the vicinity of $\pi$ and $2\pi$, then a strong attraction force acts between the A-phase coil group 14A and the magnet group 34M, as was explained with reference to FIG. 3(A), thereby causing vibrations of the rotor. From this standpoint, too, it is preferred that a voltage be not applied to the A-phase coil group 14A when the phase is in the vicinity of $\pi$ and $2\pi$. The same results are true for the B-phase coil group 24B. However, as shown in FIG. 1(B), because the B-phase coil group 24B inverts the polarity thereof at a timing with the phase of $\pi/2$ and $3\pi/2$, it is preferred that no voltage be applied to the B-phase coil group 24B when the phase is in the vicinity of $\pi/2$ and $3\pi/2$.

Figure 10A:
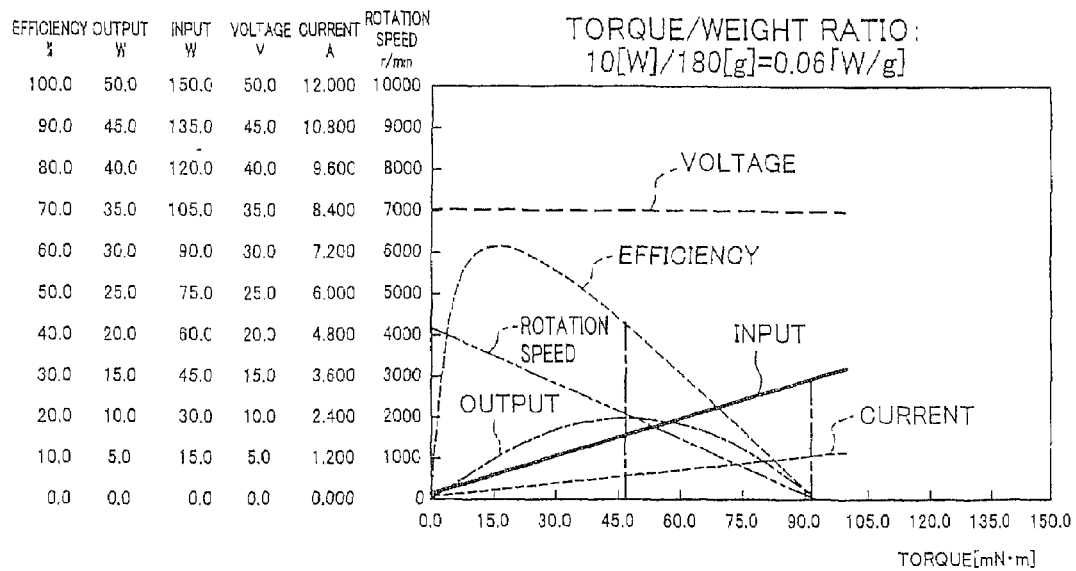
FIGS. 10(A) and 10(B) compare the characteristic of the conventional DC brush motor and the motor characteristic of the first embodiment.
Figure 10B:
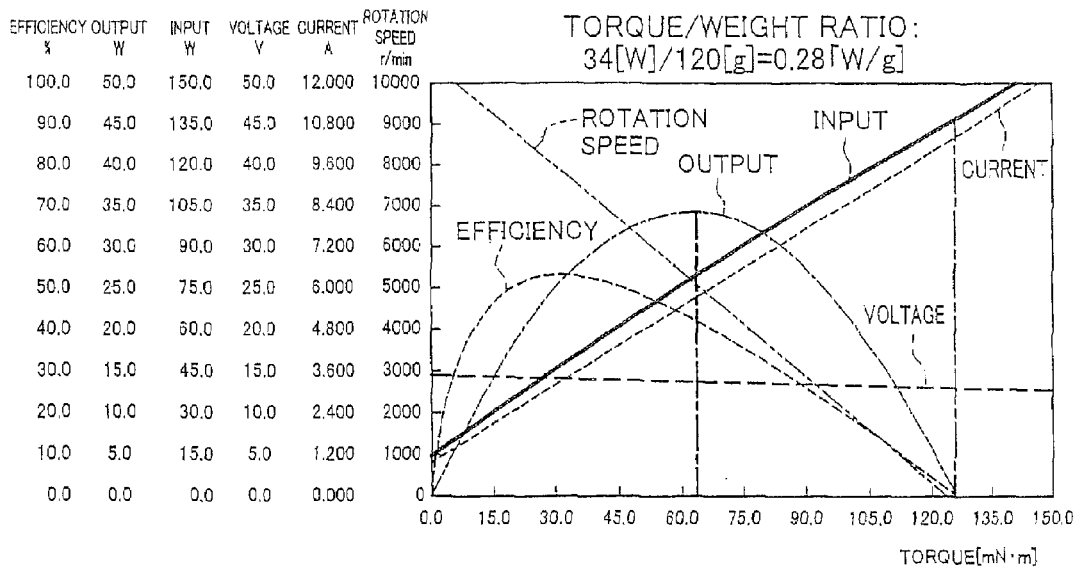

FIG. 10(A) shows the characteristics of the conventional DC brush motor. FIG. 10(B) shows motor characteristics of the first embodiment. In those drawings, a torque is plotted against the abscissa, and six characteristic values (efficiency, output, input, voltage, current, rotation speed) are plotted against the ordinate.

The motor of the first embodiments has characteristics of a DC motor. Furthermore, in comparison with the conventional DC brush motor, the motor of the first embodiment features a high maximum torque and a high efficiency during maximum output. The torque/weight ratio at a maximum output is 0.06 [W/g] in the conventional brush motor, whereas in the motor of the first embodiment, a very high value of 0.28 [W/g] is obtained. This result can be interpreted as excellent from the standpoint of balance of the weight and torque.

Detailed specifications of the motor of the first embodiment are described hereinbelow.

Coil
Wire material: copper.
Diameter: 0.3 [mm]
Number of turns: 150 [turns/bobbin]
Coil connection: pole parallel connection for each phase (FIG. 2(B)).

(2) Permanent magnet
Diameter: 14 [mm]
Thickness: 5 [mm]
Material: neodymium.
Magnetic flux density in the plane center: 3300 [G] (0.33 [T]).
Number used: 2 poles×3 phases=6

(3) Bobbin (coil core)
Diameter: 15 [mm]
Thickness: 6 [mm]
Material: phenolic resin.
Number used: 2 phases×2 poles×3 sets=12

(4) Rotor material
Diameter: 48 [mm]
Thickness: 5 [mm]
Material: aluminum.

(5) Case (main casing, lid)
Diameter: 54 [mm]
Thickness: 22 [mm]
Material: phenolic resin In the present example, aluminum is used as the rotor material (support member 32M of the magnet group structure 30M), but a nonmagnetic nonconductive material may be also used. From the standpoint of reducing the iron loss, it is preferred that a nonconductive material be used instead of aluminum as the rotor material.

Figure 11A:
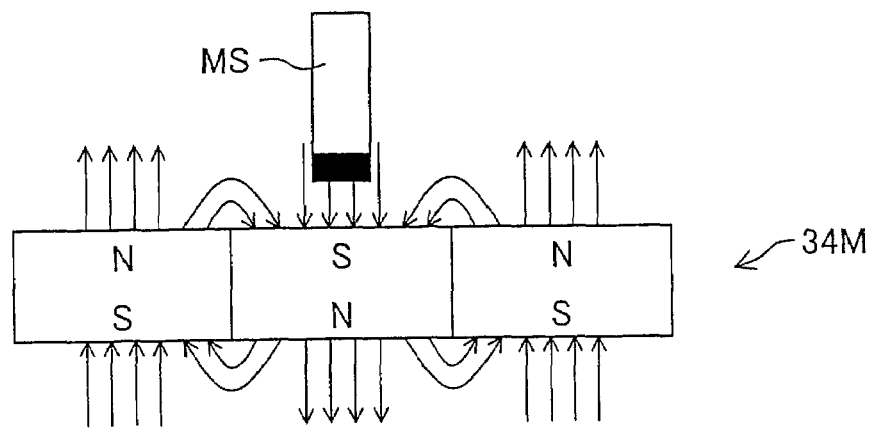
FIGS. 11(A) and 11(B) are explanatory drawings illustrating a test mode for measuring the magnetic flux density around the magnet group for considering the characteristics of the motor of the first embodiment.
Figure 11B:
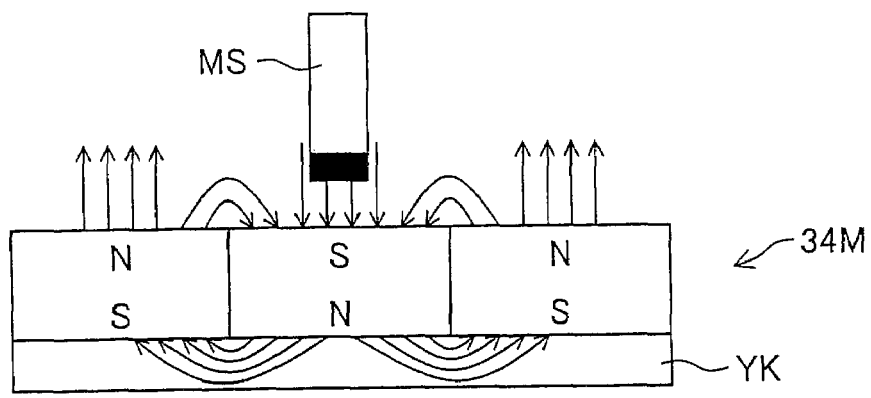

FIGS. 11(A) and 11(B) illustrate a test mode employed for measuring the magnetic flux density around the magnet group 34M in order to study the characteristics of the motor of the first embodiment. In the Test 1 illustrated by FIG. 11(A), the magnetic flux density in the vicinity of magnets was measured with a magnetic sensor MS in a state in which both sides of the magnet group 34M were opened. In the Test 2 illustrated by FIG. 11(B), the magnetic flux density in the vicinity of magnets was measured with a magnetic sensor MS in a state in which a yoke YK made from a silicon steel sheet was provided below the magnet group 34M. The results of Tests 1, 2 are described below.

Magnetic flux density measured in Test 1: 3500 G.
Magnetic flux density measured in Test 2: 4100 G.

When the yoke YK was provided, as in Test 2, the magnetic flux density on the magnet surface located opposite the yoke YK definitely increased, and the increase ratio determined based on the measurement results of Test 1 was about 17%. In the motor of the first embodiment, the drive force is generated by using the magnetic flux on both sides of the magnet group 34M in a state in which the two sides of the magnet group 34M are opened, as shown in FIG. 11(A). Therefore, it can be assumed that a magnetic flux twice that of one side of the magnet group 34M is used. Therefore, in the motor of the first embodiment, the magnetic flux of permanent magnet is used more effectively and, therefore, a larger torque can be generated than in the conventional motor provided with the yoke YK and having coils disposed on the opposite side therefrom.

FIG. 12 shows the rotation speed of the motor of the first embodiment in a state without a load. As follows from this graph, the motor of the first embodiment rotates at a very stable rotation speed down to a very low rotation speed in a state without a load. This is because there is no magnetic core, thereby generating no cogging.

As described hereinabove, in the electric motor of the first embodiment, a configuration is used in which the coil groups 14A, 24B are provided on opposite sides of the magnet group 34M and no magnetic core or yoke is used. Therefore, a large torque can be obtained at a low weight. Furthermore, there is no cogging and a stable rotation can be maintained till a very low rotation speed.

Second Embodiment

Two-Phase Motor

Figure 13A:
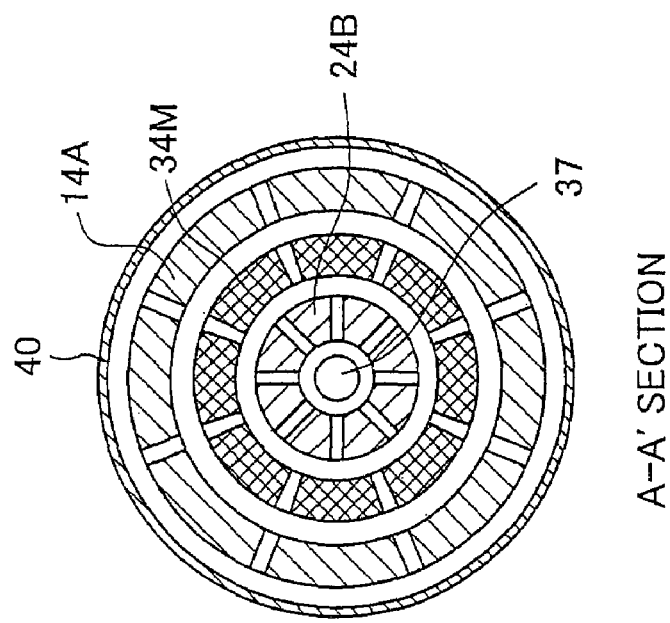
FIGS. 13(A) and 13(B) are cross-sectional views illustrating the configuration of the electric motor as a second embodiment of the present invention.
Figure 13B:
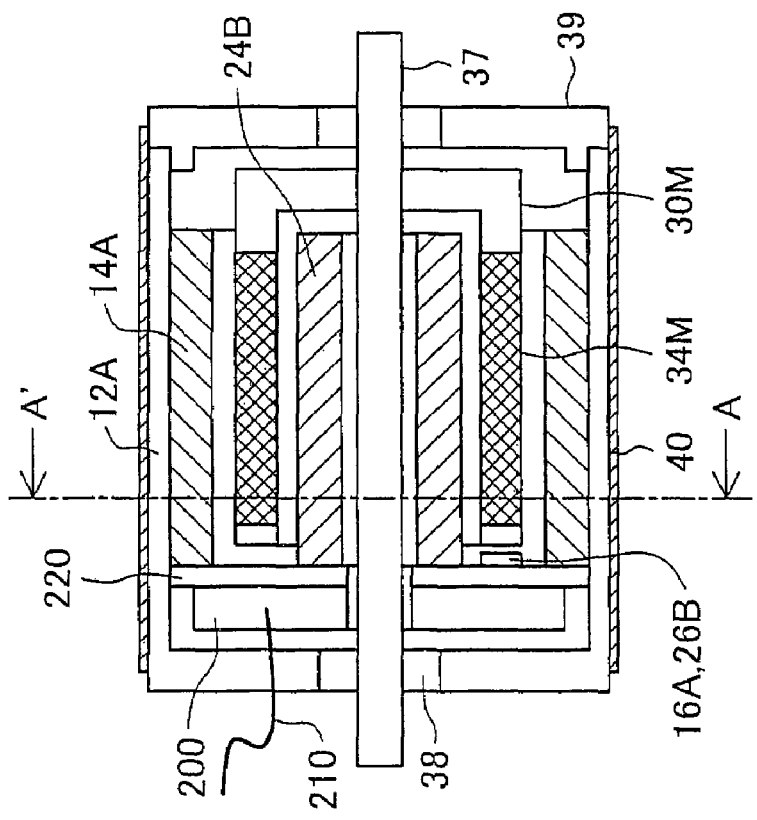
Figure 15A:
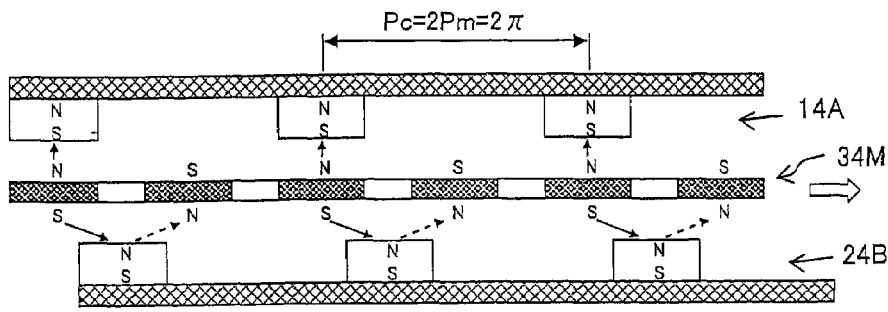
FIGS. 15(A) to 15(D) illustrate the first modification example relating to the arrangement of the coil groups and magnet group of a two-phase motor.
Figure 15B:
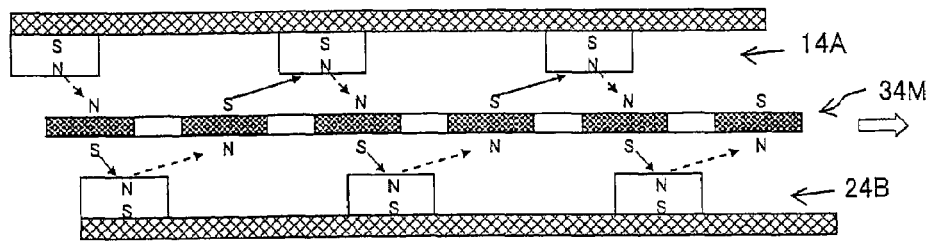
Figure 15C:
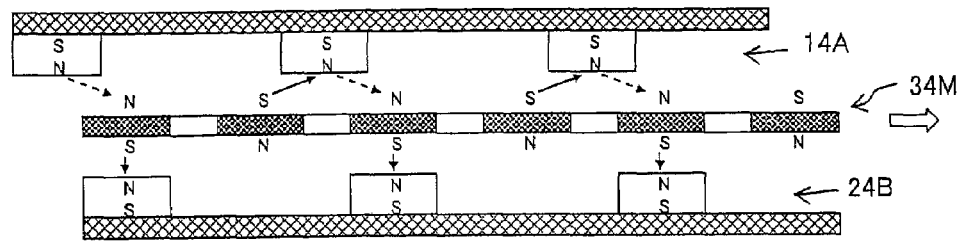
Figure 15D:
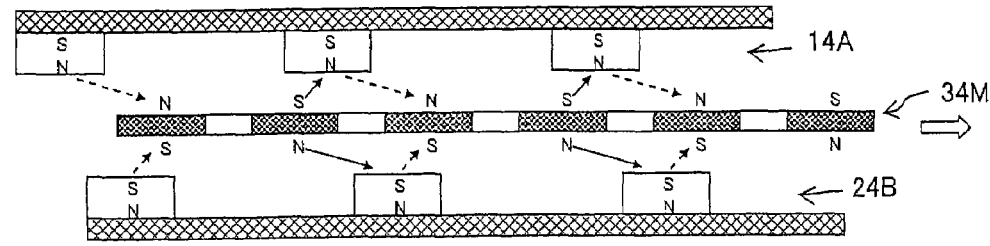
Figure 16A:
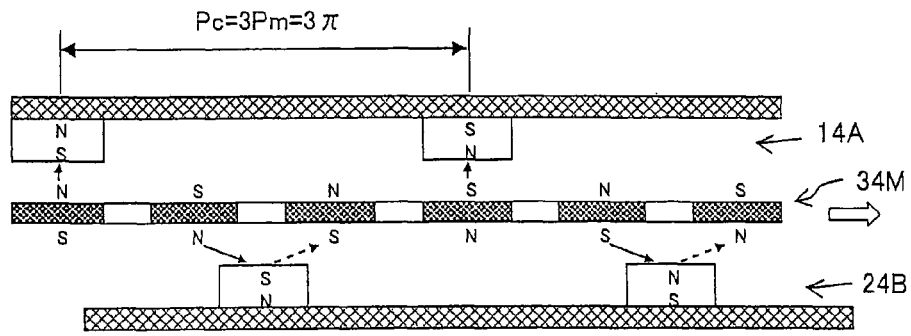
FIGS. 16(A) to 16(D) illustrate the second modification example relating to the arrangement of the coil groups and magnet group of a two-phase motor.
Figure 16B:
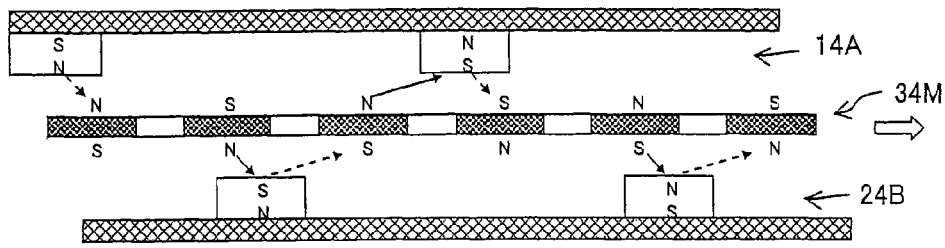
Figure 16C:
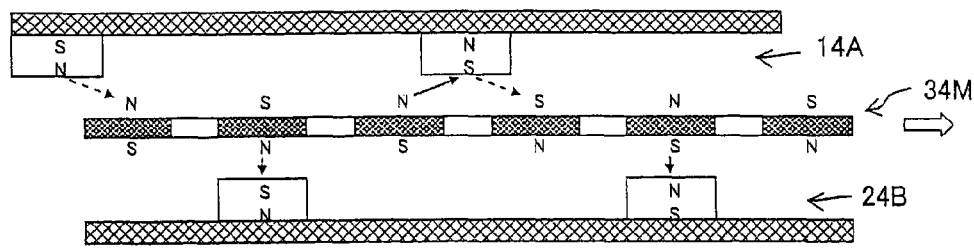
Figure 16D:
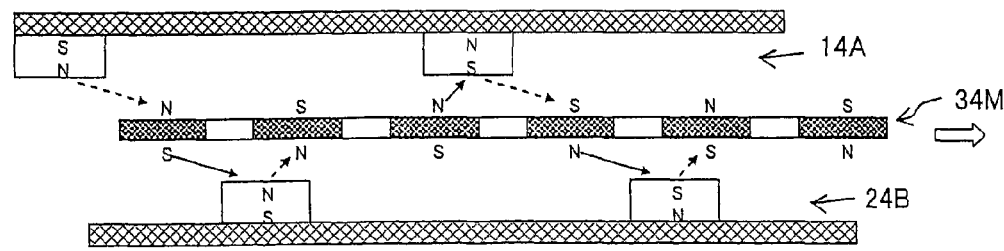
Figure 17A:
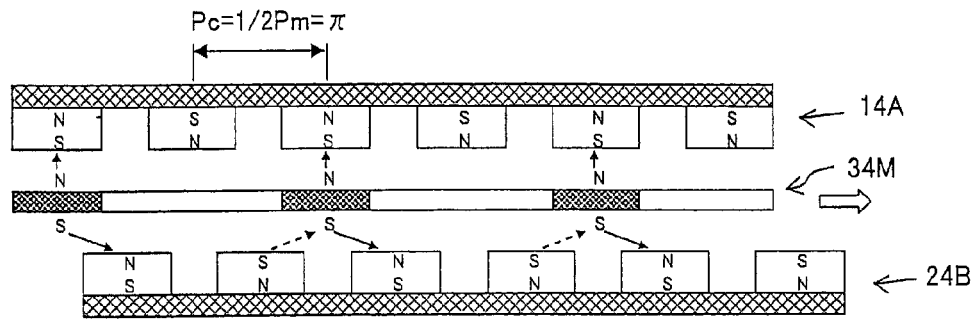
FIGS. 17(A) to 17(D) illustrate the third modification example relating to the arrangement of the coil groups and magnet group of a two-phase motor.
Figure 17B:
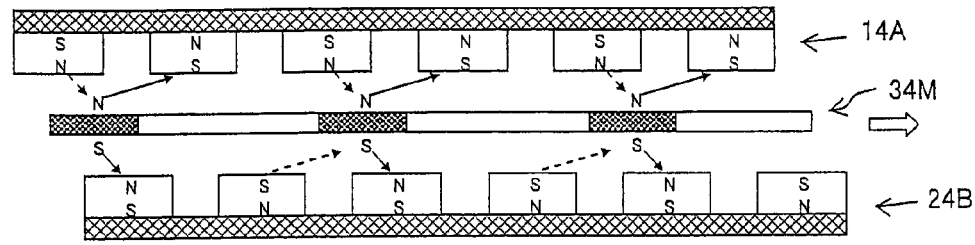
Figure 17C:
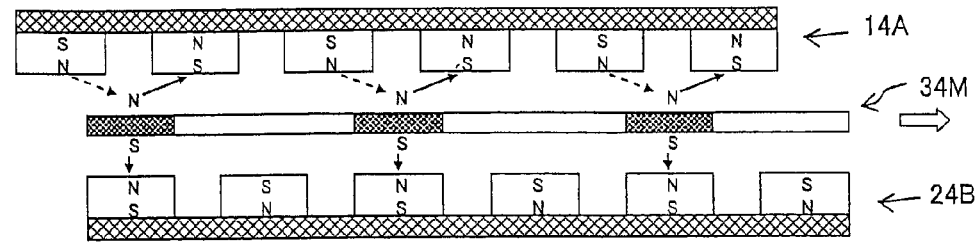
Figure 17D:
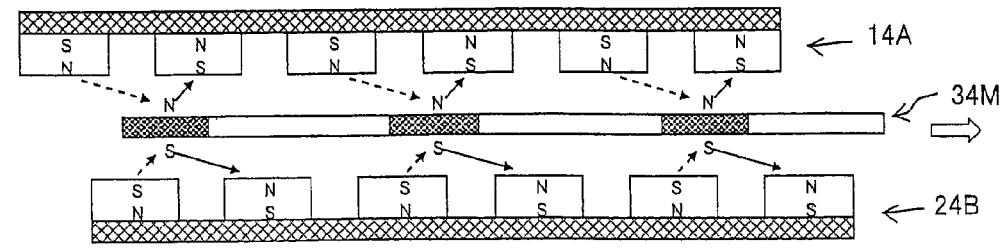
Figure 18A:
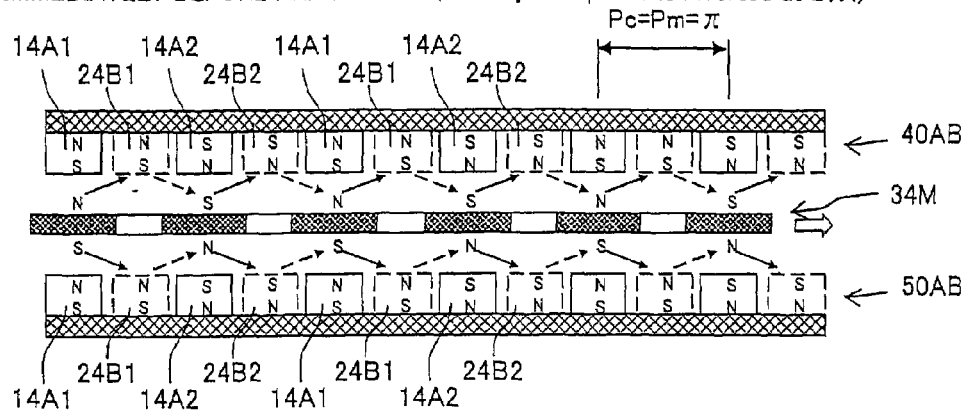
FIGS. 18(A) to 18(D) illustrate the fourth modification example relating to the arrangement of the coil groups and magnet group of a two-phase motor.
Figure 18B:
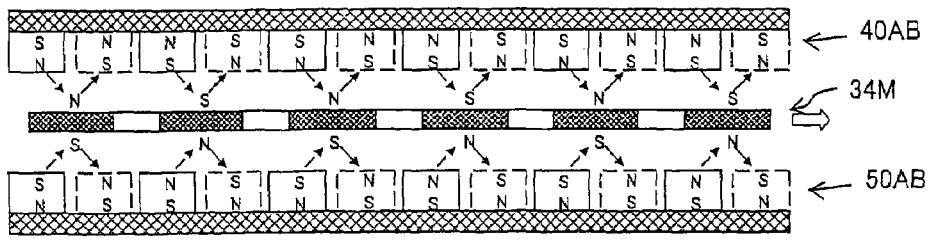
Figure 18C:
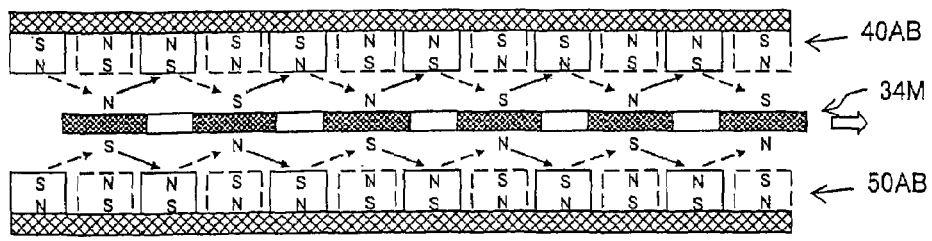
Figure 18D:
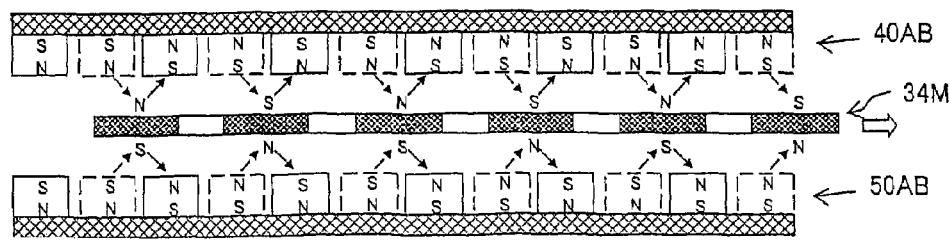
Figure 19A:
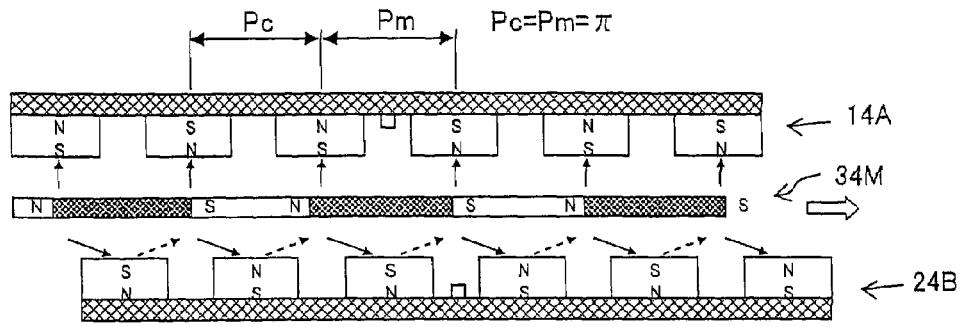
FIGS. 19(A) to 19(D) illustrate the fifth modification example relating to the arrangement of the coil groups and magnet group of a two-phase motor.
Figure 19B:
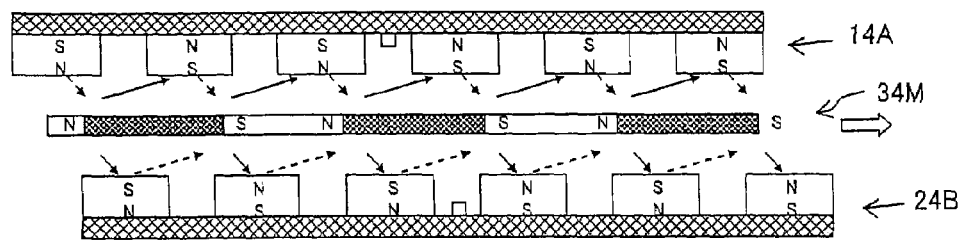
Figure 19C:
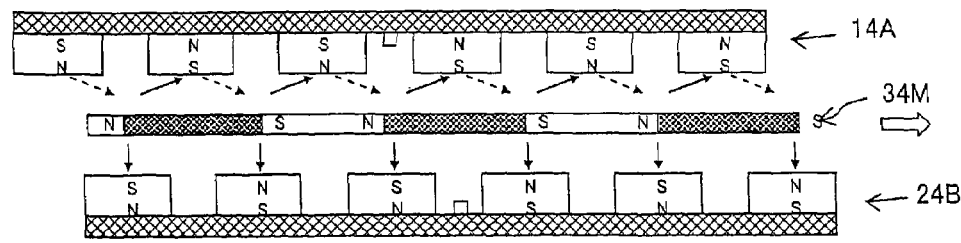
Figure 19D:
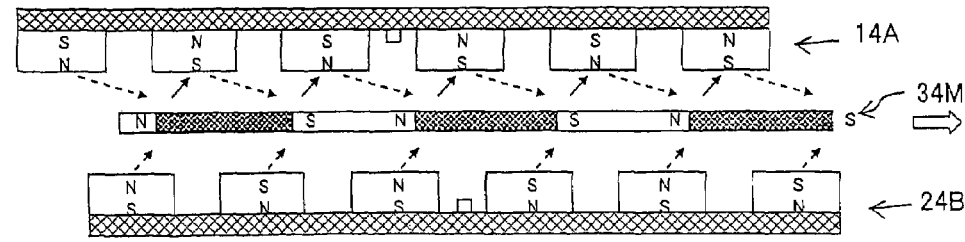

FIGS. 13(A) and 13(B) are the cross-sectional views illustrating the configuration of the electric motor of the second embodiment of the present invention. The motor of the second embodiment has an insert rotor structure in which a substantially cylindrical rotor 30M is inserted between a substantially cylindrical stator of a double-wall structure. Thus, two coil groups 14A, 24B are disposed on two cylindrical members constituting the hollow double-wall cylindrical structure, and the magnet group 34M is disposed on the other cylindrical member inserted between the coil groups 14A, 24B. The structure in which the three hollow cylindrical members are disposed coaxially will be hereinafter referred to as "hollow multilayer cylindrical structure".

FIGS. 14(A) and 14(B) show the separated rotor and stator. The stator shown in FIG. 14(A) comprises two coil groups 14A, 24B. The support member 12A of the A-phase coil group 14A located on the outer side constitutes a hollow cylindrical case. A magnetic shielding member 40 is provided on the outer side of the cylindrical surface of the case 12A. This magnetic shielding member 40 is used to prevent the magnetic flux from leaking into the outside of the motor. It is formed from a very thin ferromagnetic material (for example, Permalloy). However, the magnetic shielding member 40 does not have a yoke function for constituting the magnetic circuit. Whether a component used in the motor has a function of a yoke, can be checked by measuring the magnetic flux density by conducting the above-described test illustrated in FIG. 11. For example, when the magnetic shielding member 40 is provided, and the surface magnetic flux density of the coil group 14A increases by more than 10%, a decision is made that this member functions as a yoke. When the increase is less than 10%, a decision may be made that it does not function as a yoke. The decision criterion may be 5% rather than 10%.

A drive circuit unit 200 is provided on a substrate 2209 located inside the stator. The drive circuit unit 200 is a circuit comprising the drive signal generation circuit 100 shown in FIG. 6 and driver circuits 120A, 130B shown in FIG. 7. Power and control signals are supplied to the drive circuit unit 200 via an electric wiring 210.

The rotor 30M has a magnet group 34M, and a shaft 37 is provided in the center thereof. As shown in FIG. 14(A), a bearing 38 is provided on the bottom surface on the left side of the stator. Further, as shown in FIG. 14(B), a bearing 36 is also provided on a lid 39 for closing the case after the rotor 30M has been inserted.

In the example shown in FIG. 13(B), each of the A-phase coil group 14A and B-phase coil group 24B has eight coils, and the magnet group 34M has eight magnets. However, any number of coils and magnets may be set.

The electric motor of the second embodiment operates almost identically to the motor of the first embodiment and almost the same effect is obtained. As can be easily understood from this example, the electric actuator in accordance with the present invention can be implemented in a variety of specific modes.

Further, because the electric motor of the second embodiment has the above-described hollow double-wall cylindrical structure, the advantage thereof over the motor of the first embodiment is that the rotor vibrations are small. Thus, as has already been explained with reference to FIG. 3, a force acts on the magnetic row 34M on the side of the A-phase coil group 14A in some time, and a force acts on the side of the B-phase coil group 24B in other time, as a result of the attraction force and repulsion force from the coil groups 14A, 24B. In such cases, in the structure of the first embodiment shown in FIG. 4 (a structure in which the disk-like rotor 30M is inserted between two disk-like members supporting the coil groups 14A, 24A), the rotor 30M can oscillate in the vertical direction during rotation. By contrast, the advantage of the motor with the hollow double-wall cylindrical structure shown in FIG. 13 is that the forces causing the oscillations of the rotor 30M (unbalances attraction force and repulsion force from the coil groups 14A, 24B) cancel each other with respect to the rotation shaft as a center and, therefore, such oscillations can hardly occur.

Modification Examples of Two-Phase Motor

FIGS. 15(A) to 15(D) show the first modification example of the arrangement of coil groups and magnet group in the two-phase motor. The motor of this first modification example has a structure in which half of the coils in the A-phase coil group 14A and B-phase coil group 24B of the motor of the first embodiment shown in FIG. 1 and FIG. 3 are removed and the coil pitch Pc is doubled. The configuration of the magnet group 34M is identical to that of the first embodiment. The A-phase coil group 14A of the first modification example is equivalent to a configuration obtained by omitting one coil 14A2 of the two coils 14A1, 14A2 (FIG. 1 of the A-phase coil group 14A of the first embodiment. Therefore, all the coils of the A-phase coil group 14A of the first modification example are always magnetized in the same direction.

FIGS. 16(A) to 16(D) illustrate the second modification example relating to the arrangement of coil groups and magnet group in the two-phase motor. The motor of the second modification example has a configuration in which the number of coils of the A-phase coil group 14A and B-phase coil group 24B of the motor of the first embodiment illustrated by FIG. 1 and FIG. 3 is reduced by a factor of 3 and the coil pitch Pc is tripled. The configuration of the magnet group 34M is identical to that of the first embodiment. Further, in the second modification example, the mutual arrangement of the A-phase coil group 14A and B-phase coil group 24B is shifted by $3\pi/2$. It is clear that the A-phase coil group 14A and B-phase coil group 24B of the two-phase motor may be shifted from each other by an odd number of $\pi/2$ in terms of electric angle.

FIGS. 17(A) to 17(D) show the third modification example relating to the arrangement of coil groups and magnet group in the two-phase motor. The motor of the third modification example has a configuration in which the number of magnets of the magnet group 34M of the motor of the first embodiment illustrated by FIG. 1 and FIG. 3 is reduced by half and the pole pitch Pm is doubled. The configuration of the A-phase coil group 14A and B-phase coil group 24B is identical to that of the first embodiment.

The above-described first to third modification examples are constructed by removing part of the coils or part of the magnets from the configurations of the first embodiment, but it can be easily understood that the motors of those modification examples operate based on the same principles as the motor of the first embodiment. However, from the standpoint of magnetic flux utilization efficiency, the motor of the first embodiment is superior to the motors of the second and third modification examples.

FIGS. 18(A) to 18(D) illustrate the fourth modification example relating to the arrangement of coil groups and magnet group in the two-phase motor. In the motor of the fourth modification example, the upper coil group 40AB and a lower coil group 50AB are provided on both sides of the magnet group 34M. The upper coil group 40AB is equivalent to disposing both the A-phase coil group 14A and B-phase coil group 24B of the first embodiment, which are shown in FIG. 1 and FIG. 3, on the upper side. Thus, the upper coil group 40AB comprises two coils 14A1, 14A2 included in the A-phase coil group 14A and two coils 24B1, 24B2 included in the B-phase coil group 24B, those coils being disposed in a prescribed order. The lower coil group 50AB is also equivalent to disposing both the A-phase coil group 14A and the B-phase coil group 24B of the first embodiment on the lower side. Further, for the sake of convenience, in FIGS. 18(A) to 18(D), the coils of the A-phase coil group are represented by solid lines, and the coils of the B-phase coil group are represented by broken lines. The number of coils in the motor of the fourth modification example is twice as large as that of the motor of the first embodiment. Since the coil pitch Pc is determined as the pitch between the coils of the A-phase coil group and the pitch between the coils of the B-phase coil group, the coil pitch PC of the fourth modification example is identical to that of the first embodiment.

Both the upper coil group 40AB and the lower coil group 50AB of the fourth embodiment have the coil groups of the A-phase and B-phase. Therefore, one of the upper coil group 40AB and lower coil group 50AB can be omitted. However, from the standpoint of effective utilization of the magnetic flux of the motor, it is preferred that both the upper coil group 40AB and the lower coil group 50AB be provided.

FIGS. 19(A) to 19(D) illustrate the fifth modification example relating to the arrangement of coil groups and magnet group in the two-phase motor. In the motor of the fifth modification example, the magnetization direction of the magnets of the magnet group 34M of the motor of the first embodiment shown in FIG. 1 and FIG. 3 is in the operation direction (sidewise direction in the figure) of the magnet group 34M. The magnet pole pitch Pm is identical to that of the first embodiment, but the number of magnets is half that of the first embodiment. The configuration of the A-phase coil group 14A and B-phase coil group 24B is identical to that of the first embodiment. However, the magnetization direction of the B-phase coil group 24B is inversed with respect to that of the first embodiment shown in FIG. 13. Thus, it can be understood that the magnetization direction of the operation almost similar to that of the first embodiment is conducted despite the fact that the magnetization direction of the magnets is in the operation direction of the rotor (in this example, the magnet group 34M).

Further, As can be easily understood from those modification examples, the number of coils included in the A-phase and B-phase coil groups and the number of magnets included in the magnet group can be set to various values. However, from the standpoint of the magnetic flux utilization efficiency, it is preferred that the number of coils of the coil group of each phase be equal to the number of magnetic poles (or the number of magnets) of the magnet group.

Third Embodiment

Three-Phase Motor

Figure 20A:
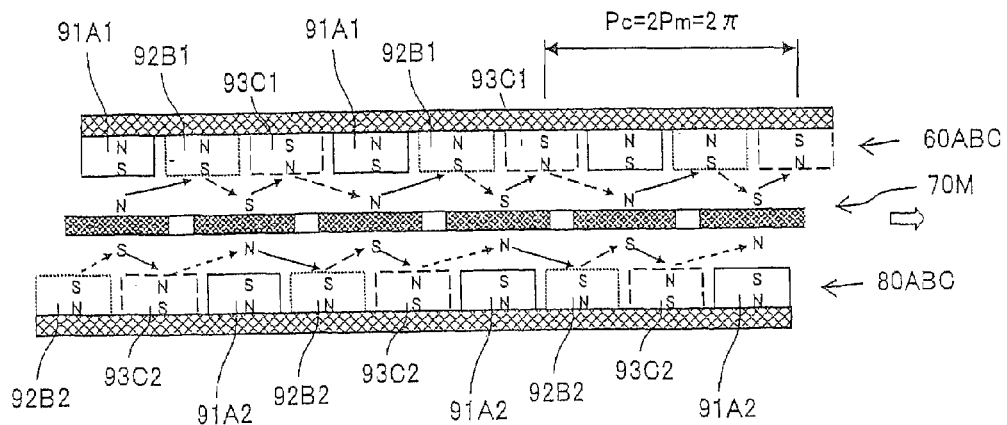
FIG. 20(A) to 20(C) illustrate the schematic configuration of the electric motor of the third embodiment of the present invention.
Figure 20B:
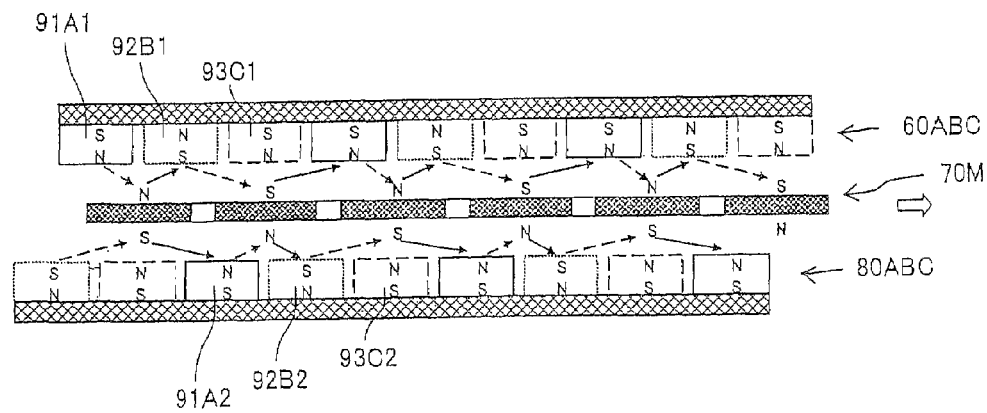
Figure 20C:
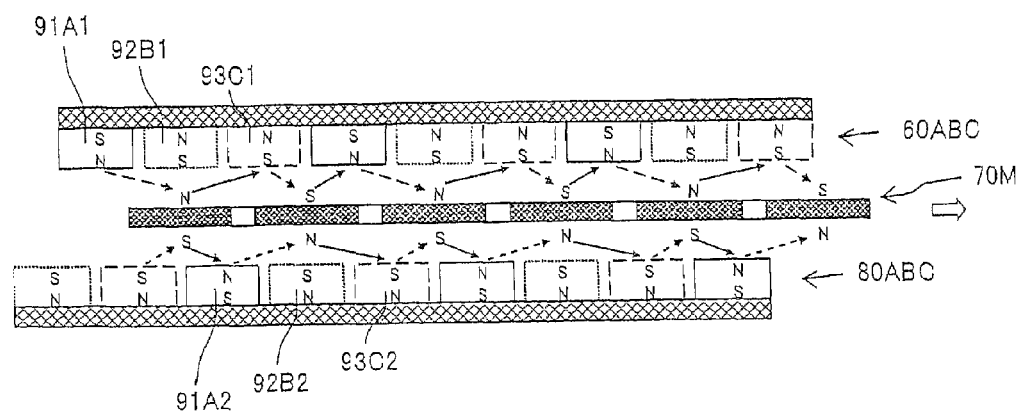

FIG. 20(A) to 20(C) are the explanatory drawings illustrating schematically the configuration of the electric motor of the third embodiment in accordance with the present invention. The motor of the third embodiment is a three-phase motor having three coil groups for A-phase, B-phase, and C phase. The magnet group 50M has a configuration identical to that of the magnet group 34M of the first embodiment shown in FIG. 3(A). An upper coil group 60ABC and lower coil group 80ABC are provided on both sides of the magnet group 70M. The upper coil group 60ABC comprises coils 91A1 of the A-phase coil group, coils 92B1 of the B-phase coil group, and coils 93C1 of the C phase coil group, those coils being disposed in a prescribed order. Further, for the sake of convenience, in FIGS. 20(A) to 20(C), the coils of the A-phase coil group are represented by the solid lines, the coils of the B-phase coil group are represented by the dotted lines, and the coils of the C phase coil group are represented by the broken lines. Similarly, the lower coil group 80ABC comprises coils 91A2 of the A-phase coil group, coils 92B2 of the B-phase coil group, and coils 93C2 of the C phase coil group. The A-phase coils 91A1 of the upper coil group 60ABC and the A-phase coils 91A2 of the lower coil group 80ABC are magnetized in the opposite directions. The same is true for the B-phase coils and C phase coils. The coil pitch of the A-phase, B-phase, and C phase is twice the magnetic pole pitch Pm and is equivalent to $2\pi$ in terms of electric angle. The A-phase coils 91A1 of the upper coil group 60ABC are disposed in locations shifted by an electric angle of $\pi$ from the positions of the A-phase coils 91A2 of the lower coil group 80ABC. The B-phase coils and C phase coils have a similar disposition. Further, the coils of the A-phase, B-phase, and C phase are disposed in positions successively shifted by an electric angle of $\pi/3$.

FIG. 20(A) shows a state immediately before the phase is $2\pi$. At the timing with the phase of $2\pi$, the polarities of the A-phase coil groups 91A1, 91A2 are inverted. FIG. 20(B) shows a state immediately before the phase is $\pi/3$. At the timing with the phase of $\pi/3$, the polarities of the C phase coil groups 93C1, 93C2 are inverted. FIG. 20(C) shows a state immediately before the phase is $2\pi/3$. At the timing with the phase of $2\pi/3$, the polarities of the B-phase coil groups 92B1, 92B2 are inverted.

In the three-phase motor of the third embodiment, the polarities (magnetization direction) of the A-phase coil groups 91A1, 91A2 are switched at a timing when each coil of the phase coil groups 91A1, 91A2 are opposite to the magnets of the magnet group 70M. The same is true for the B-phase coil groups and C phase coil groups. As a result, a drive force can be always generated from all the coils. Therefore a large torque can be generated.

Further, the three-phase motor of the third embodiment, too, similarly to the motor of the first embodiment, has no core from a magnetic material and comprises no yoke constituting the magnetic circuit. Furthermore, it is preferable that all the structural components other that the rotary shaft and bearing be formed from nonmagnetic nonconductive materials.

FIG. 21 is a block diagram illustrating the configuration of the drive signal generation circuit of the third embodiment. The drive signal generation circuit 100a is obtained by adding circuit components (for example, voltage comparators 115, 116) for the C phase and also adding a sine wave generation circuit 108 to the circuitry for the two-phase motor shown in FIG. 6.

The sine wave generation circuit 108 generates three sine wave signals SA, SB, SC with phases shifted by $2\pi/3$ for the sensor signals SSA, SSB, SSC of the three phases. The three sine wave signals SA, SB, SC are inputted in the voltage comparators 111 to 116. They are also supplied to a two-stage PWM circuit 130a. The circuitry of the multiprocessor 120a and two-stage PWM circuit 130a is changed from those shown in FIG. 6 to be adapted for three phases. Three-phase drive signal pairs (DRVA1, DRVA2), (DRVB1, DRVB2), and (DRVC1, DRVC2) are outputted from the two-stage PWM circuit 130a. The waveforms of the drive signals are almost identical to those shown in FIG. 8 and FIG. 9, the only difference being that the phase difference between the phases is $2\pi/3$.

Figure 22:
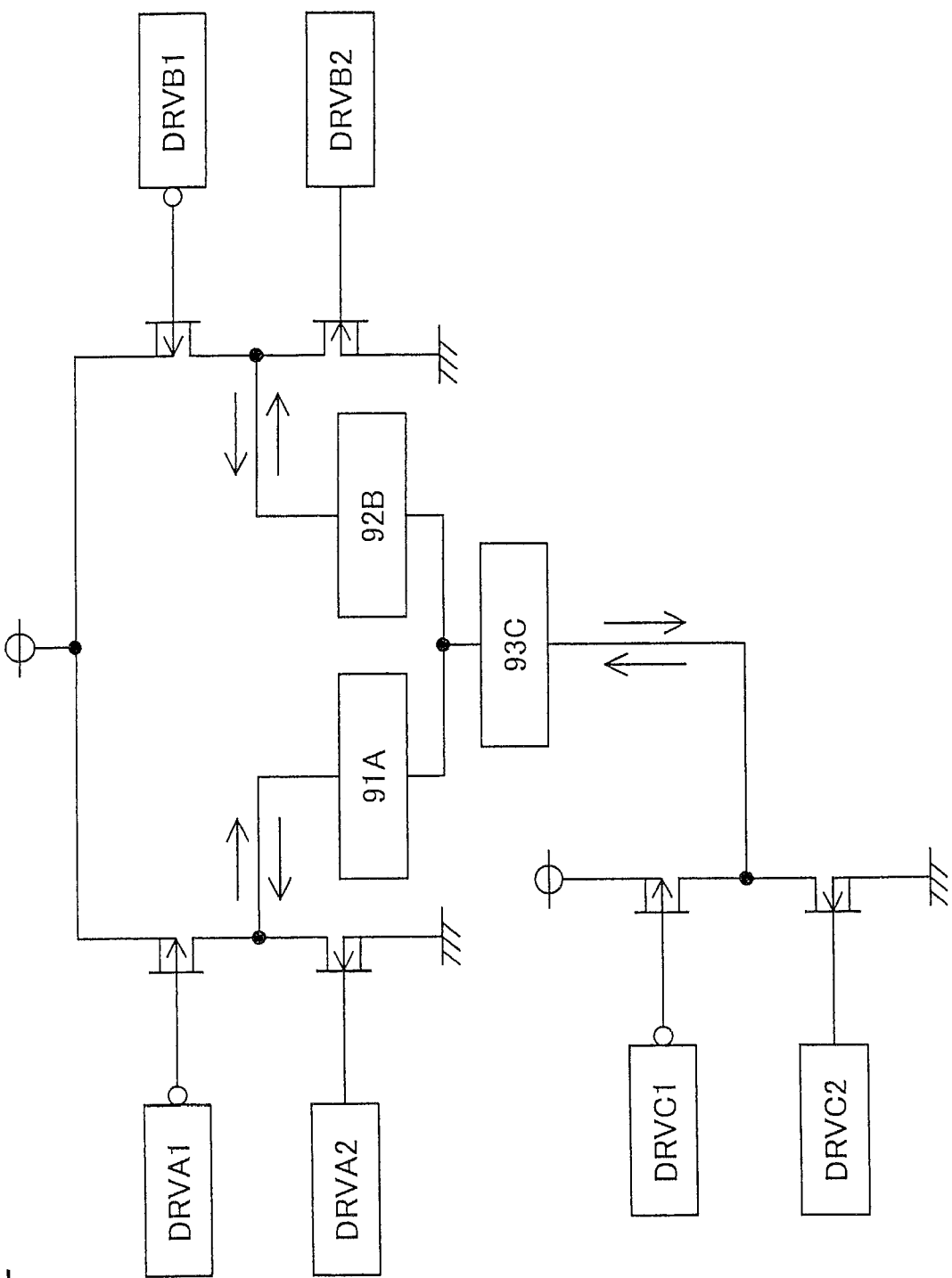
FIG. 22 is clock diagram illustrating the configuration of the driver circuit of the third embodiment.
Figure 24A:
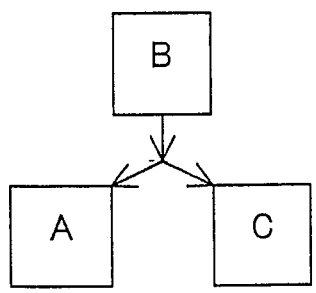
FIG. 24(A) to 24(F) are the explanatory drawings illustrating the electric current direction in the periods P1 to P6 of the third embodiment.
Figure 24B:
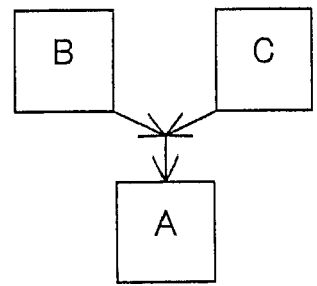
Figure 24C:
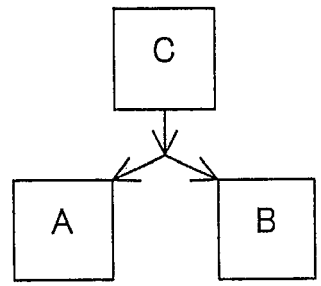
Figure 24D:
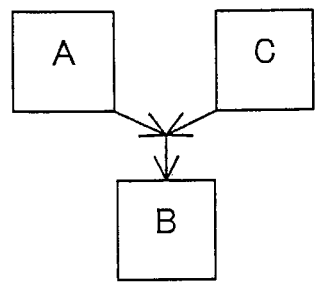
Figure 24E:
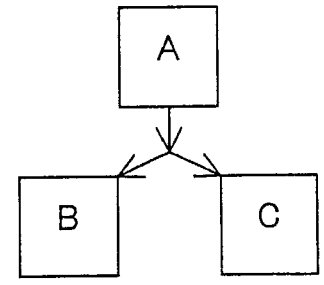
Figure 24F:
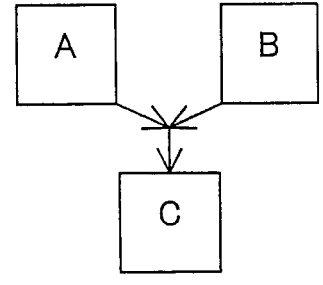

FIG. 22 is a block diagram illustrating the configuration of the diver circuit of the third embodiment. The driver circuit 140 is a three-phase bridge circuit for driving the coil groups 91A, 92B, 93C.

FIG. 23 is a timing chart illustrating the excitation direction of coils of each phase and sensor signals of the third embodiment. The sensor signals SSA, SSB, SSC of the A, B, C phases are the digital signals that are switched between an H level and an L level for each interval with a length of $\pi$ as an electric angle. Further, the phase of each phase is successively shifted by $2\pi/3$. The magnetization direction of each coil group of the A, B, C phases is shown in the lower part in FIG. 23. The magnetization direction of each coil group is determined by logic computation of the three sensor signals SSA, SSB, SSC.

FIGS. 24(A) to 24(F) show the direction of electric current in six intervals P1 to P6 shown in FIG. 23. In the present embodiment, the coil groups of the A, B, C phases have a star-like connection, but they may also have a delta-like connection. In the period P1, an electric current flows from the B-phase coil group to the A-phase and C phase coil groups. In the period P2, an electric current flows from the B-phase and C phase coil groups to the A-phase coil group. Thus, a large torque can be generated where each coil group is so driven that the electric current always flows to each coil group of A, B, C phases.

In the three-phase motor of the third embodiment, too, the coil groups are provided on opposite sides of the magnet group 70M and the drive force is generated by using the magnetic flux on both sides of the magnet group 70M. Therefore, a large drive force can be obtained. Furthermore, the three-phase motor of the third embodiment also has a configuration comprising no core and yoke from magnetic materials. Therefore, a large torque can be obtained at a small weight. Further, cogging can be eliminated and stable operation can be maintained even at a very low rotation rate.

The three-phase motor also can be configured as a cylindrical motor, as in the above-described second embodiment. Moreover, the modifications similar to the above-described various modifications of the first embodiment can be also applied to the three-phase motor of the third embodiment.

Fourth Embodiment

Figure 25:
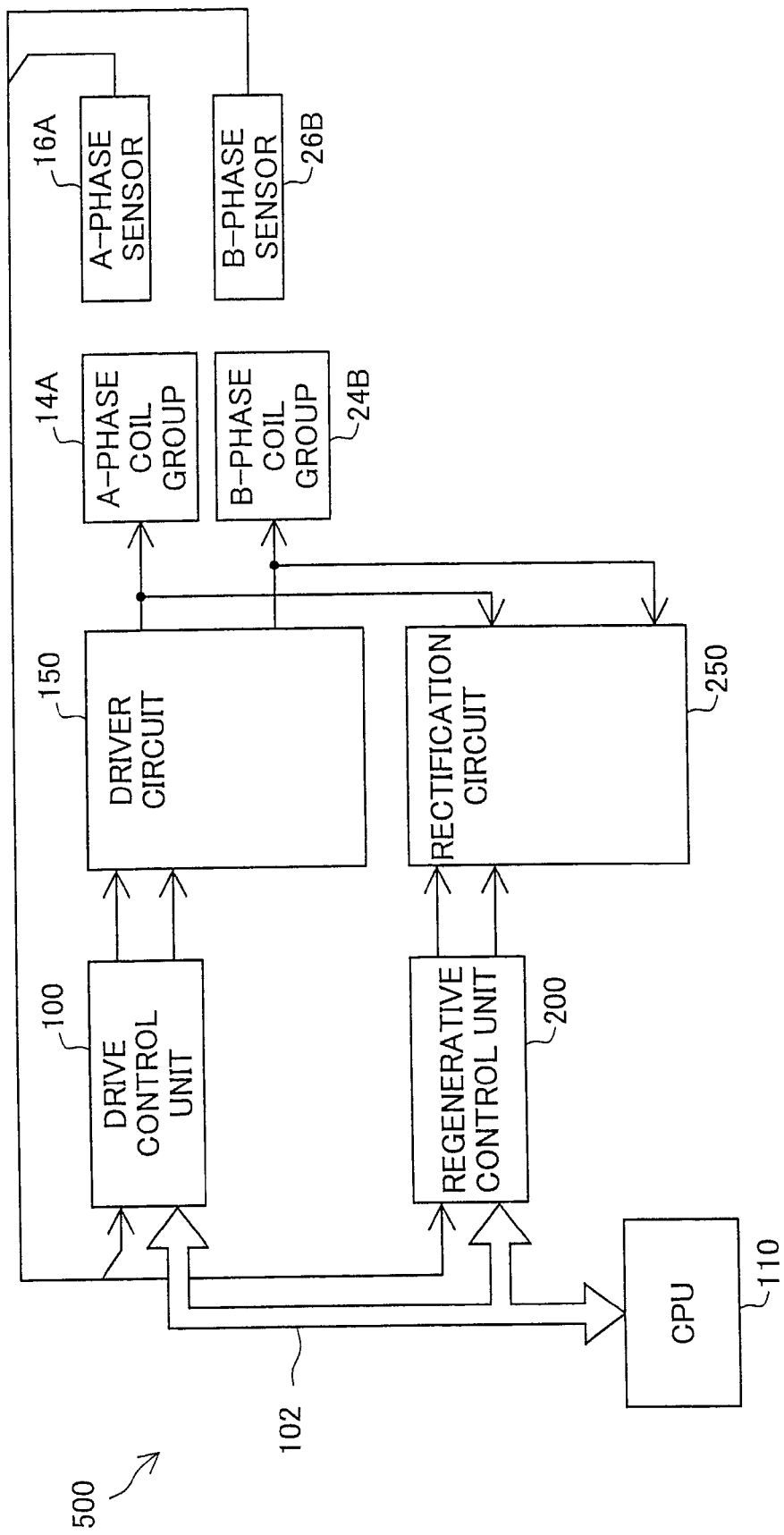
FIG. 25 is a block diagram illustrating the configuration of the drive circuit unit in the fourth embodiment.

FIG. 25 is a block diagram illustrating the internal configuration of the drive circuit unit of the fourth embodiment. The hardware configuration other than that of the drive circuit unit is identical to that of the above-described first embodiment and the explanation thereof is therefore omitted.

The drive circuit unit 500 comprises a CPU 110, a drive control unit 100, a regenerative control unit 200, a driver circuit 150, and a rectification circuit 250. The two control units 100, 200 are connected to the CPU 110 via a bus 102. The drive control unit 100 and driver circuit 150 are the circuits for conducting control for causing the electric actuator to generate a drive force. The regenerative control unit 200 and rectification circuit 250 are the circuits for conducting control for causing the electric actuator to regenerate electric power. The combination of the regenerative control unit 200 and rectification circuit 250 may be referred to as "regenerative circuit".

The drive control unit 100 is identical to the drive signal generation circuit 100 explained with reference to FIG. 6. The driver circuit 150 is a circuit composed of the A-phase drive circuit 120A and B-phase drive circuit 130B explained with reference to FIG. 7. Therefore, the explanation of the internal configuration and operation of those circuits 100, 150 is omitted.

Figure 26:
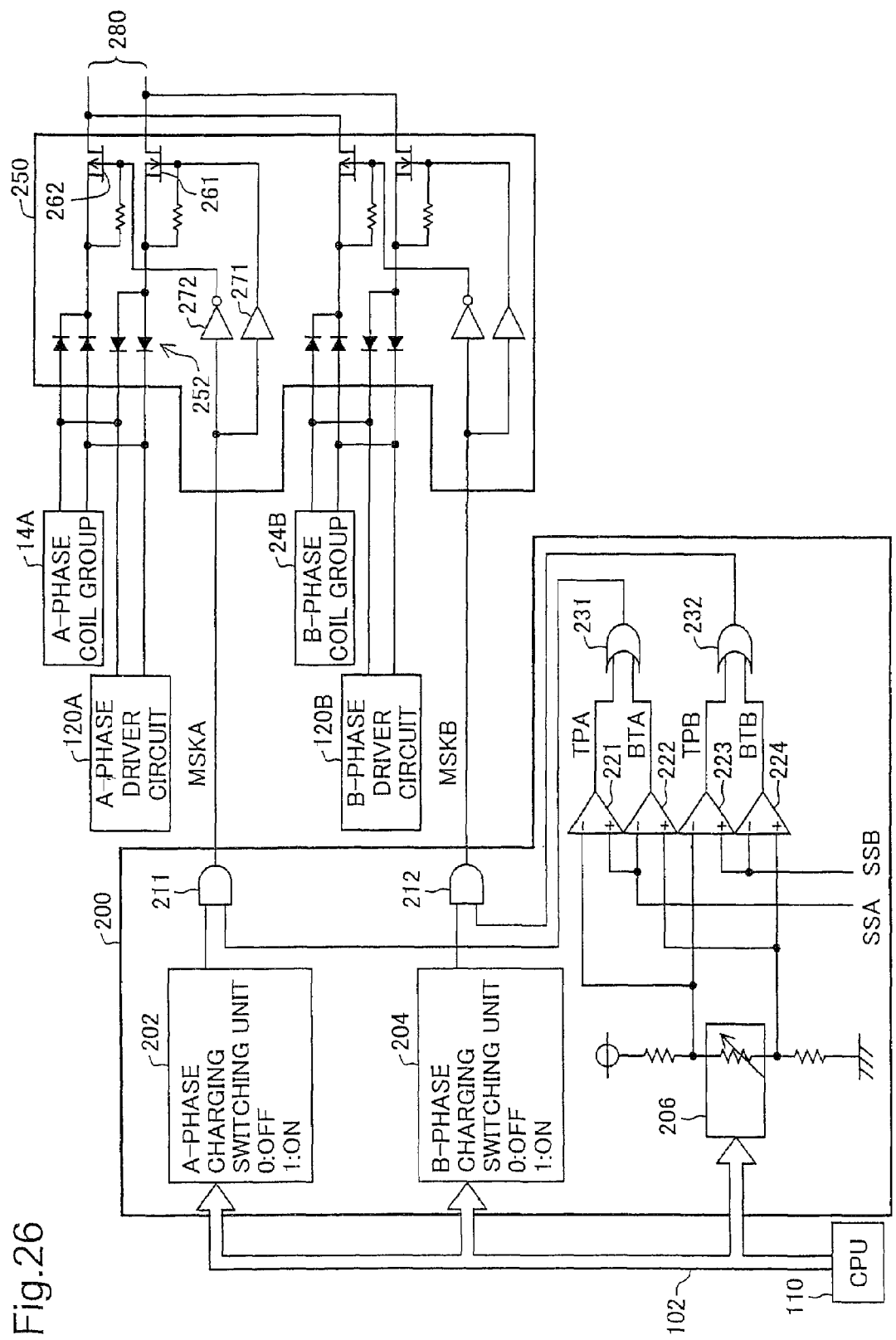
FIG. 26 illustrates the internal configuration of the regenerative control unit and driver circuit for relative rate reduction.

FIG. 26 illustrates the internal configuration of the regenerative control unit 200 and rectification circuit 250. The regenerative control unit 200 comprises an A-phase charge switching unit 202 connected to the bus 102, a B-phase charge switching unit 204, and an electronically variable resistor 206. The output signals of the two charge switching units 202, 204 are applied to the input terminals of the two AND circuits 211, 212.

The A-phase charge switching unit 202 outputs a signal of a "1" level when the regenerative power from the A-phase coil group 14A is recovered, and outputs a signal of a "0" level when the power is not recovered. The same is true for the B-phase charge switching unit 204. The switching of those signal levels is conducted with the CPU 110. The presence or absence of regeneration from the A-phase coil group 14A and the presence or absence of regeneration from the B-phase coil 24B can be set independently. Therefore, for example, electric power can be regenerated from the B-phase coil group 24B, while generating a drive force in the actuator by using the A-phase coil group 14A.

The drive control unit 100, similarly, may have a configuration such that whether or not the drive force is generated by using the A-phase coil group 14A and whether or not the drive force is generated by using the B-phase coil group 24B can be set independently. For example, the operation mode signal generation unit 104 may be configured so that the signal indicating the presence or absence of the drive of the A-phase coil group 14A and the signal indicating the presence or absence of the drive of the B-phase coil group 24B can be outputted from the operation mode signal generation unit 104 shown in FIG. 6. In such a case, the electric actuator can be operated in an operation mode such that a drive force is generated in any one of the two coil groups 14A, 24B, while electric power is regenerated in the other coil group.

The voltage across the electronically variable resistor 206 is applied to one of the two input terminals of the four voltage comparators 221-224. The A-phase sensor signal SSA and B-phase sensor signal SSB are applied to the other input terminal of the voltage comparators 221-224. The output signals TPA, BTA, TPB, BTB of the four voltage comparators 221-224 can be called "mask signals" or "permission signals".

The mask signals TPA, BTA for the A-phase coils are inputted into the OR circuit 231, and the mask signals TPB, BTB for the B-phase are inputted into the other OR circuit 232. The outputs of those OR circuits 231, 232 are supplied to the input terminals of the above-mentioned two AND circuits 211, 212. The output signals MSKA, MSKB of those AND circuits 211, 212 are called "mask signals" or "permission signals".

The configurations of the electronically variable resistor 206 and the four voltage comparators 221-224 are identical to those of the electronically variable resistor 106 of the drive signal generation circuit 100 shown in FIG. 6 and the four voltage comparators 111-114. Therefore, the output signal of the OR circuit 231 for the A-phase coils is equivalent to the logic sum of the mask signals TPA, BTA shown in FIG. 8. Further, when the output signal of the A-phase charge switching unit 202 is at a "1" level, the mask signal MSKA outputted from the AND circuit 211 for the A-phase coils is identical to the output signal of the OR circuit 231. Those operations are identical to those relating to the B-phase.

The rectification circuit 250 has the circuitry for the A-phase coils which includes a full-wave rectification circuit 252 comprising a plurality of diodes, two gate transistors 261, 262, a buffer circuit 271, and an inverter circuit 272 (NOT circuit). The identical circuitry is also provided for the B-phase. The gate transistors 261, 262 are connected to the power wiring 280 for regeneration.

During power regeneration, the AC power generated in the A-phase coil group 14A is rectified with the full-wave rectification circuit 252. The mask signal MSKA for the A-phase coils and the inverted signal thereof are supplied to the gates of the gate transistors 261, 262, and the gate transistors 261, 262 are ON/OFF controlled accordingly. Therefore, within a period in which at least one of the mask signals TPA, BTA outputted from the voltage comparators 221, 222 is at an H level, the regenerated power is outputted to the power source wiring 280. On the other hand, within an interval in which both mask signals TPA, BTA are at an L level, power regeneration is inhibited.

As clearly follows from the explanation provided hereinabove, the regenerated power can be recovered by using the regenerative control unit 200 and rectification circuit 250. Furthermore, the regenerative control unit 200 and rectification circuit 250 can restrict the interval in which the regenerated power from the A-phase coil group 14A and B-phase coil group 24B is recovered, according to the mask signal MSKA for the A-phase coils and the mask signal MSKB for the B-phase coils, thereby making it possible to adjust the quantity of the regenerated power.

As described hereinabove, with the electric actuator of the present embodiment, no core made from a magnetic material is provided. Therefore, the so-called cogging does not occur even during regeneration and smooth and stable operation can be realized. Further, because a yoke designed to constitute a magnetic circuit is not provided, the so-called iron loss (eddy current loss) is extremely small and the regenerated power can be recovered with good efficiency.

It should be noted that the drive circuit unit of the fourth embodiment can be also applied to electric actuators of other embodiments and modification examples other than the first embodiment.

Other Modification Examples

In the above-described embodiments or modification examples, the explanation was conducted with respect to a rotary motor. However, the present invention is also applicable to various electric actuators other than rotary motors, for example, it can be applied to linear motors. When the present invention is applied to a linear motor, for example, the magnet group may include at least one magnet. Furthermore, the present invention is not limited to actuators and can be also applied to generators.

In the above-described embodiments, a plurality of coil groups constituted a stator and a magnet group constituted a rotor. However, the inverse configuration is also possible. In general, the present invention can be applied to actuators and generators in which the relative position between a plurality of coil groups and a magnet group is changeable.

The circuit configurations used in the above-described embodiments and modifications are merely examples, and circuit configuration of a variety of other types can be also employed.

INDUSTRIAL APPLICABILITY

The present invention can be employed in various electric actuators and generators such as rotary motors and linear motors.

The invention claimed is:
1. An electric machine comprising:
a coil group including a plurality of electrically interconnected coils disposed along a predetermined direction at a predetermined pitch;
a magnet group including at least one magnet, wherein N poles and S poles are disposed alternately opposite the coil group and a relative position of the magnet group with the coil group is changeable along the prescribed direction;
a magnetic sensor associated with the coil group, the magnetic sensor being configured to detect magnetic flux change due to movement of the magnet group to thereby generate a sinusoidal output signal; and
a drive signal generation circuit that executes PWM control based on the sinusoidal output signals of the magnetic sensor to thereby generate an AC drive signal to be supplied to the coil group,
wherein the drive signal generation circuit generates the AC drive signal so that polarity of each coil in the coil group are switched when center of each coil is opposite to one of centers of the magnets in the magnet group, and that magnetic flux density in the coil group reaches a maximum value at a timing when midway points between two adjacent coils in the coil group are opposite to the centers of the magnets in the magnet group,
wherein the drive signal generation circuit includes:
a PWM circuit for generating a PWM signal; and
a masking circuit for generating the signal AC drive signal by masking the PWM signal according to an output demand of the electric machine, and
wherein the masking circuit masks the PWM signal in temporal ranges that are symmetrically centered around a timing at which polarities of the AC drive signal are inverted while maintaining the PWM signals in other temporal ranges that are symmetrically centered around peaks of the AC drive signal.
2. An electric machine according to claim 1, further comprising a case for housing the coil group and the magnet group, wherein each of the coils in the coil group is wound around a support member formed from a substantially nonmagnetic and non-electroconductive material, and the case is formed from a substantially nonmagnetic and non-electroconductive material.

3. An electric machine according to claim 1, wherein structural members with exception of shafts and bearings are formed from substantially nonmagnetic and non-electroconductive material.

4. An electric machine according to claim 1, wherein the plurality of coils in the coil group are interconnected in such a manner that adjacent coils belonging to the coil group are always excited with mutually opposite polarities.

5. An electric machine according to claim 1, wherein the electric machine is a rotary motor or a rotary generator, in which the coil group and the magnet group rotate relative to each other in accordance with the predetermined direction, and the number of coils in the coil group, and the number of magnets in the magnet group are equal to each other.

6. An electric machine according to claim 1, wherein the drive signal generation circuit reverses an operation direction of the coil group and the magnet group by reversing the electric current direction in the coil group.

7. An electric machine according to claim 1, further comprising:

a regenerative circuit for regenerating electric power from the coil group.

8. An electric machine according to claim 1, wherein the coil group is disposed on a first cylindrical member constituting a hollow double-wall cylindrical structure, and the magnet group is disposed on a second cylindrical member coaxial with the first cylindrical member.

* * * * *